US012084911B2

(12) United States Patent
Lee

(10) Patent No.: US 12,084,911 B2

(45) Date of Patent: Sep. 10, 2024

(54) WINDOWS AND DOORS ASSEMBLY HAVING VENTILATION FUNCTION AND HORIZONTAL CONTACT FUNCTION

(71) Applicant: CS TECH CO., LTD., Cheonan-si (KR)

(72) Inventor: Jae Son Lee, Cheonan-si (KR)

(73) Assignee: CS TECH CO., LTD., Cheonan-si (KR)

( * ) Notice: Subject to any disclaimer, the term of this patent is extended or adjusted under 35 U.S.C. 154(b) by 944 days.

(21) Appl. No.: 17/058,628

(22) PCT Filed: May 4, 2020

(86) PCT No.: PCT/KR2020/005913

§ 371 (c)(1),
(2) Date: Nov. 24, 2020

(87) PCT Pub. No.: WO2021/149873

PCT Pub. Date: Jul. 29, 2021

(65) Prior Publication Data

US 2021/0404246 A1 Dec. 30, 2021

(30) Foreign Application Priority Data

Jan. 23, 2020 (KR) ........................ 10-2020-0009013
Jan. 23, 2020 (KR) ........................ 10-2020-0009022
Feb. 25, 2020 (KR) ........................ 10-2020-0023252

(51) Int. Cl.
*E06B 7/02* (2006.01)
*E05C 1/16* (2006.01)
(Continued)

(52) U.S. Cl.
CPC .................. *E06B 7/02* (2013.01); *E05C 1/16* (2013.01); *E05D 15/06* (2013.01); *E06B 3/46* (2013.01); *E06B 7/16* (2013.01)

(58) Field of Classification Search
CPC ..... E06B 7/02; E06B 3/46; E06B 7/16; E05C 1/16; E05D 15/06
(Continued)

(56) References Cited

U.S. PATENT DOCUMENTS

2007/0130725 A1* 6/2007 Ness ................... E05D 15/0669 16/105
2009/0038228 A1* 2/2009 Lee ......................... E05D 15/10 49/506
2015/0052819 A1* 2/2015 Lee ..................... E05D 15/0621 49/420

FOREIGN PATENT DOCUMENTS

DE 2700598 A1 7/1978
EP 2871312 B1 4/2017
(Continued)

*Primary Examiner* — Steven B McAllister
*Assistant Examiner* — Charles R Brawner
(74) *Attorney, Agent, or Firm* — Park, Kim & Suh, LLC

(57) ABSTRACT

The present disclosure relates to a windows and doors assembly having a ventilation function and a horizontal contact function, and more particularly to a horizontal contact windows and doors assembly for crime prevention and security functions by preventing a window from being open even when the window is slightly open and it is possible to ventilate with the outside air. To achieve the objective of the present disclosure, the windows and doors assembly having a ventilation function and a horizontal contact function includes a window frame, and a windowsill in which the window frame is slidably installed, a handle rotatably installed on the window frame, an engagement unit provided on a lateral surface of the window frame, linked to movement of the handle, and moved in upward and downward directions, an engagement guide provided on the windowsill to face the engagement unit and configured to catch or not catch the engagement unit depending on a position of the engagement unit, and a horizontal moving (Continued)

device provided on at least one of a top surface or a bottom surface of the window frame, linked to the handle, and configured to make the window frame horizontally come into contact with the windowsill or to release horizontal contact depending on movement of the handle, and in this case, when a contact state of the window with respect to the windowsill by the horizontal contact device is released while a catching operation between the engagement unit and the engagement guide is performed, it is possible to ventilate through a gap between the window and the windowsill, the window is restrictly moved to form the gap, and the window is prevented from being freely open.

16 Claims, 20 Drawing Sheets

(51) Int. Cl.

| | |
|---|---|
| ***E05D 15/06*** | (2006.01) |
| ***E06B 3/46*** | (2006.01) |
| ***E06B 7/16*** | (2006.01) |

(58) Field of Classification Search

USPC .......................................................... 454/196

See application file for complete search history.

(56) References Cited

FOREIGN PATENT DOCUMENTS

| | | | | | |
|---|---|---|---|---|---|
| KR | 20-1995-0009162 | U | 4/1995 | | |
| KR | 10-2009-0083130 | A | 8/2009 | | |
| KR | 10-2012-0050035 | A | 5/2012 | | |
| KR | 10-1142795 | B1 | 5/2012 | | |
| KR | 10-1254327 | B1 | 4/2013 | | |
| KR | 10-2013-0115958 | A | 10/2013 | | |
| KR | 10-1469252 | B1 | 12/2014 | | |
| KR | 10-2016-0033690 | A | 3/2016 | | |
| KR | 10-1731775 | B1 | 4/2017 | | |
| KR | 101731775 | * | 4/2017 | ............. | E05C 19/00 |
| KR | 10-1983841 | B1 | 5/2019 | | |
| KR | 101983841 | * | 5/2019 | ............. | E05B 1/003 |

* cited by examiner

WINDOWS AND DOORS ASSEMBLY HAVING VENTILATION FUNCTION AND HORIZONTAL CONTACT FUNCTION

CROSS-REFERENCE TO RELATED APPLICATIONS

This application is the National Stage filing under 35 U.S.C. 371 of International Application No. PCT/KR2020/005913, filed on May 4, 2020, which claims the benefit of Korean Patent Application No. 10-2020-0009013, filed on Jan. 23, 2020, Korean Patent Application No. 10-2020-0009022, filed on Jan. 23, 2020, and Korean Patent Application No. 10-2020-0023252, filed on Feb. 25, 2020, the contents of which are all hereby incorporated by reference herein in their entirety.

TECHNICAL FIELD

The present disclosure relates to a windows and doors assembly having a ventilation function and a horizontal contact function, and more particularly to a horizontal contact windows and doors assembly for crime prevention and security functions by preventing a window from being open even when the window is slightly open and it is possible to ventilate with the outside air.

BACKGROUND ART

In general, a windows and doors assembly functions as a wall for separating an indoor space and an outdoor space from each other, and simultaneously ventilates the indoor space by introducing sunlight and fresh outside air and allows a user to look outside and to feel open. The windows and doors assembly is broadly classified into hinged windows and doors assembly and a sliding windows and doors assembly depending on an opening type of a window.

The sliding windows and doors assembly has the advantages of being conveniently open and manipulated and being aesthetic compared with the hinged windows and doors assembly, but has the disadvantages of degraded performance in terms of airtightness, water tightness, and wind resistance because a gap is present between a windowsill and a window in the state in which the window is closed.

Thus, as a method of overcoming the above disadvantages of the sliding windows and doors assembly, a horizontal contact device for improving the airtightness performance of the sliding windows and doors assembly by moving a window from the position, at which the window is closed, in a horizontal direction perpendicular to a straight moving direction of the window to come into contact with a windowsill and removing a gap between the windowsill and the window is developed.

For example, as the conventional horizontal contact device, the "Horizontal Contact Windows and Doors" disposed in Korean Patent Publication No. 10-2012-0050035 has been known. The conventional horizontal contact device includes a roller housing maintained to be caught by a rail of a windowsill, a base plate that is fixedly installed on the window, and a guide plate and a link member that connect the roller housing and the base plate to each other, an inclined guide hole is formed in the guide plate at the base plate, and an operating bar of hardware includes a guide pin guided to the inclined guide hole.

Accordingly, the base plate is moved close to or apart from the roller housing in a horizontal direction through a guide plate and a link member by straightly moving the operating bar of the hardware to guide the guide pin to the inclined guide hole, and thus, the airtightness of the windows and doors assembly is maintained by bringing the window into contact with the windowsill while the window is closed, and the window is easily open by bringing the window apart from the windowsill while the window is open.

The "Device for compressing sliding door to fixed door frame" disclosed in Korean Publication No. 10-2016-0033690 includes a guide member maintained to be caught by a rail of a windowsill, and a fixing member that is fixedly installed to a window, an inclined guide hole is formed at the guide member, and an operating bar of hardware includes a guide pin guided to the inclined guide hole, in which case the fixing member is moved close to or apart from the guide member in a horizontal direction by straightly moving the operating bar to guide the guide pin to the inclined guide hole, and thus, the airtightness of the windows and doors assembly is maintained by bringing the window into contact with the windowsill while the window is closed, and the window is easily open by bringing the window apart from the windowsill while the window is open.

However, conventionally, only a closed state or an open state is executed, and an open state of a window needs to be inevitably maintained for ventilation, and accordingly, there is a problem of security or crime prevention.

DISCLOSURE

Technical Problem

It is an object of the present disclosure to overcome a problem of intrusion of an outsider even when a window is slightly open and it is possible to ventilate with the outside air.

Technical Solution

To achieve the objective of the present disclosure, according to the present disclosure, windows and doors assembly having a ventilation function and a horizontal contact function includes a window frame, and a windowsill in which the window frame is slidably installed, a handle rotatably installed on the window frame, an engagement unit provided on a lateral surface of the window frame, linked to movement of the handle, and moved in upward and downward directions, an engagement guide provided on the windowsill to face the engagement unit and configured to catch or not catch the engagement unit depending on a position of the engagement unit, and a horizontal moving device provided on at least one of a top surface or a bottom surface of the window frame, linked to the handle, and configured to make the window frame come into horizontal contact with the windowsill or to release horizontal contact depending on movement of the handle, wherein the horizontal moving device includes a fixing plate, a moving plate disposed to be relatively moved on the fixing plate in a horizontal direction in which the window comes into contact with the windowsill or is moved apart from the windowsill and including a moving unit moveably installed along a rail of the windowsill, a straight moving member that is connected to the fixing plate and is straightly moved by a predetermined distance by moving an operating bar connected to the handle of the window, and a pair of operating links configured to horizontally move the moving plate with respect to the fixing plate as the straight moving member is straightly moved, wherein the straight moving member includes an operating hole into which an operating pin of the operating bar is inserted and configured to move the straight moving member immediately when the handle is rotated, and a guide hole into which a connection pin for connecting the operating links is inserted and configured to guide movement of the connection pin by moving the straight moving member, and when a contact state of the window with respect to the windowsill by the horizontal contact device is released while a catching operation between the engagement unit and the engagement guide is performed, it is possible to ventilate through a gap between the window and the windowsill, the window is restrictly moved to form the gap, and the window is prevented from being freely open.

The engagement unit may include an engagement step formed with a step difference, the engagement guide may include a body part, an engagement groove formed on the body part, and an opening formed below the engagement groove and connected to the engagement groove, and the engagement groove may include an upper groove, an intermediate groove, and a lower groove, and the upper groove is disposed to be inclined in one direction compared with the lower groove.

The intermediate groove may connect the upper groove and the lower groove to each other and is diagonally formed.

A direction in which in which the upper groove is inclined may correspond to a direction in which the window frame comes into contact with the windowsill.

When an end portion of the handle is positioned downwards to position the engagement unit at a first position, the engagement unit may be positioned on the upper groove and is caught by an edge of the upper groove, when the end portion of the handle is horizontally positioned and the engagement unit is positioned at a second position lower than the first position, the engagement unit may be positioned on the lower groove and is caught by an edge of the lower groove, and when the end portion of the handle is positioned upwards and the engagement unit is positioned at a third position than the second position, the engagement unit may deviate downwards from the lower groove.

When the engagement unit is positioned at the first position, the window frame may come into contact with the windowsill and becomes in a closing state, when the engagement unit is positioned at the second position, a contact state of the window frame with respect to the windowsill may be released, a slight gap between a lateral surface of the window frame and a lateral surface of the windowsill is formed, and the engagement unit is caught by the engagement guide to prevent the window from being open, and when the engagement unit is positioned at the third position, the contact state of the window frame with respect to the windowsill may be released, a state in which the engagement unit is caught by the engagement guide may be released, and the window frame may slide with respect to the windowsill to allow the window to be open.

The operating links may include a first link having one end connected to the fixing plate and a another end connected to the straight moving member, and disposed to be inclined at a predetermined operating angle with respect to a straight moving direction of the straight moving member to change the operating angle as the straight moving member is straightly moved, and a second link disposed to be symmetric with the first link, having one end connected to the moving plate and a another end connected to the straight moving member, and configured to change an operating angle as the straight moving member is straightly moved.

The guide hole may include a straight moving path parallel to a moving direction of the straight moving member, and an extension moving path that extends from the straight moving path and extends in a different direction from the straight moving path.

The straight moving path may include a first straight moving path connected to the extension moving path, and including a connection pin positioned thereon configured to connect the first link and the second link to each other in a state in which the engagement unit is caught by the lower groove of the engagement guide, and a second straight moving path connected to the first straight moving path, and including a connection pin positioned thereon configured to connect the first link and the second link to each other in a state in which the engagement unit is released from the engagement guide.

The windows and doors assembly may further include a moving unit provided on the moving plate and including a plurality of wheels, and a height adjuster provided on the moving plate and configured to adjust a height of the moving unit, wherein the height adjuster may include an internal housing surrounded by the moving unit and including an inclined guide hole into which a fixing shaft penetrating the moving unit is inserted, an external housing surrounding the internal housing and including a vertical guide hole into which the fixing shaft is inserted and formed in upward and downward directions, and a height adjusting screw configured to screw the internal housing and the external housing to each other, and configured to adjust an interval between the internal housing the external housing, and to adjust a vertical height of the fixing shaft inserted into the inclined guide hole and the vertical guide hole to adjust the height of the moving unit.

Advantageous Effects

According to the present disclosure, security may be advantageously reinforced by adding a ventilable mode as well as a closing mode and an opening mode of windows of prior art and doors assembly to execute the state in which it is possible to ventilate and a window is not capable of being open.

In detail, an engagement unit installed on a frame of the window is caught by an engagement groove formed in a cam groove of an engagement guide, and in particular the window may be limited to slide by making the engagement step of the engagement unit be caught by a lower groove below an upper groove that executes the closing mode.

In the case of the ventilable mode, a horizontal contact state of the window with respect to the windowsill may be released and a gap between the windowsill and the window may be formed.

When the current mode is switched to the ventilable mode from the closing mode, only a handle may be simply rotated in the closing mode, and thus it may be possible to easily and rapidly switch the closing mode to the ventilable mode.

A straight moving path provided on a straight moving member may be formed long way, and the straight moving path may be divided into a first straight moving path and a second straight moving path. In the ventilable mode, a coupling pin for connecting links is positioned on the first straight moving path, and in the opening mode, a coupling pin is positioned on the second straight moving path, and accordingly, the ventilable mode is actually and smoothly executed.

BEST MODE

Figure 1:
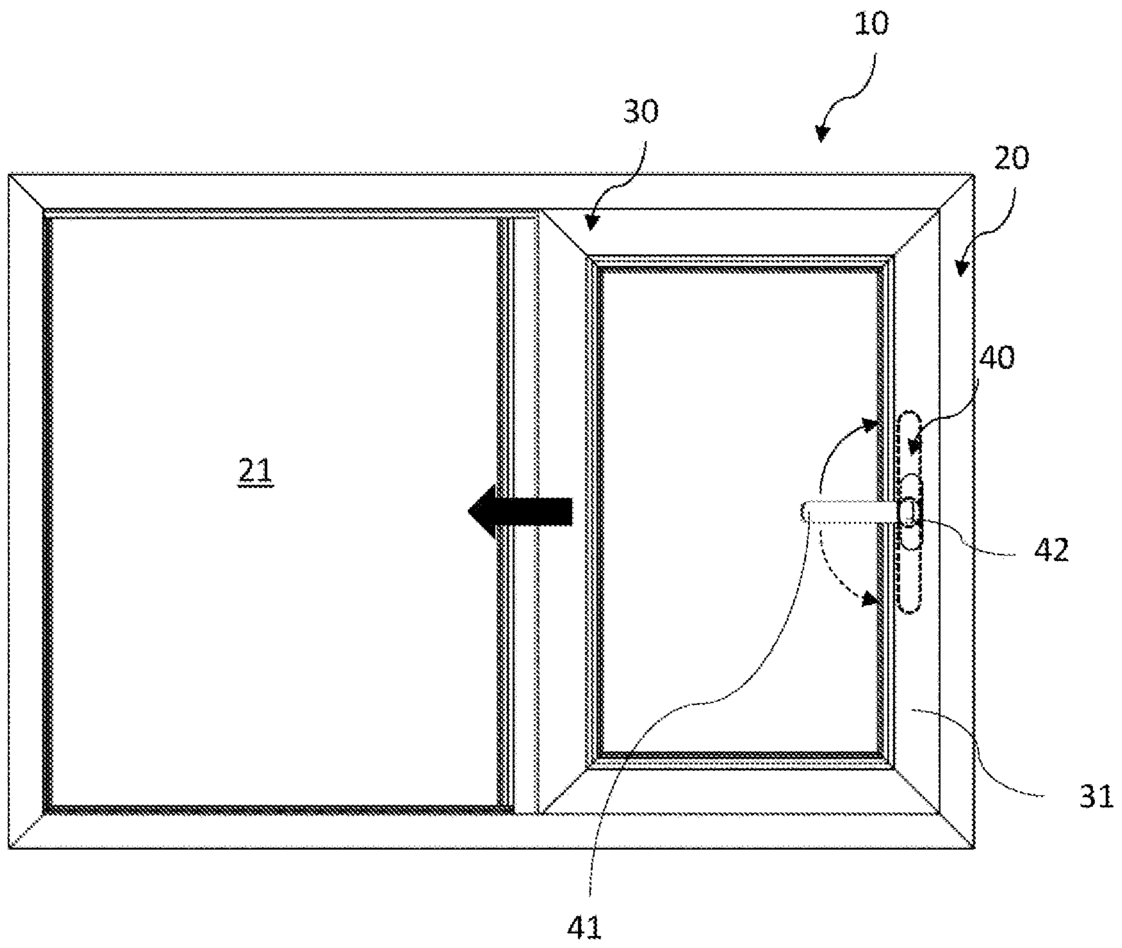
FIG. 1 is a side view of a windows and doors assembly according to the present disclosure.

As the present disclosure allows for various changes and numerous embodiments, particular embodiments will be illustrated in the drawings and described in detail in the written description.

However, this is not intended to limit the present disclosure to particular modes of practice, and it is to be appreciated that all changes, equivalents, and substitutes that do not depart from the spirit and technical scope of the present disclosure are encompassed in the present disclosure.

The terms such as "first" and "second" are used herein merely to describe a variety of constituent elements, but the constituent elements are not limited by the terms.

The terms are used only for the purpose of distinguishing one constituent element from another constituent element.

For example, a first element may be termed a second element and a second element may be termed a first element without departing from the teachings of the present disclosure.

As used herein, the term "and/or" includes any and all combinations of one or more of the associated listed items.

It will be understood that when an element, such as a layer, a region, or a substrate, is referred to as being "on", "connected to" or "coupled to" another element, it may be directly on, connected or coupled to the other element or intervening elements may be present.

In contrast, when an element is referred to as being "directly on," "directly connected to" or "directly coupled to" another element or layer, there are no intervening elements or layers present.

The terms used herein is for the purpose of describing particular embodiments only and is not intended to be limiting of the present disclosure.

The singular forms "a," "an" and "the" are intended to include the plural forms as well, unless the context clearly indicates otherwise.

It will be further understood that the terms "comprises" or "comprising" when used in this specification, specify the presence of stated features, integers, steps, operations, elements, or components, but do not preclude the presence or addition of one or more other features, integers, steps, operations, elements, components, or groups thereof.

Hereinafter, the present disclosure will be described in detail by explaining exemplary embodiments of the disclosure with reference to the attached drawings. The same reference numerals in the drawings denote like elements, and a repeated explanation thereof will not be given.

A windows and doors assembly having a horizontal contact function (hereinafter referred to as the "windows and doors assembly") 10 according to the present disclosure may include a windowsill 20 having an opening 21 in which a rail is formed and a window is moveable, and a window 30 that is accommodated in the windowsill 20 and is slidably positioned.

The window 30 may include a window frame 31 provided at an edge thereof, and a rotatable handle 40 may be provided on one surface of the window frame 31. The handle 40 may be rotatable by 180 degrees in upward and downward directions. The state of the window depending on the position of the handle 40 will now be described.

When an end portion 41 (an opposite side to a rotation portion 42) of the handle 40 is directed upwards, the window 30 may become in an open state. The window frame 31 and the windowsill 20 may not be in a horizontal contact state, and the window frame 31 may not be caught by any part of the windowsill 20.

Thus, when a user moves the window 30 in a direction indicated by a solid arrow, the window frame 31 may be moved along a rail and may become in an open state. That is, as shown in FIG. 2, the window frame 31 may be moved in a left direction in FIG. 2 or in an outward direction of the windowsill 20, and may become apart from an intermediate region of the windowsill 20.

Here, reference numeral 1100 that is not described may be a horizontal contact device, and reference numeral 22 that is not described may be a rail on which a wheel provided in the horizontal contact device is accommodated.

Figure 2:
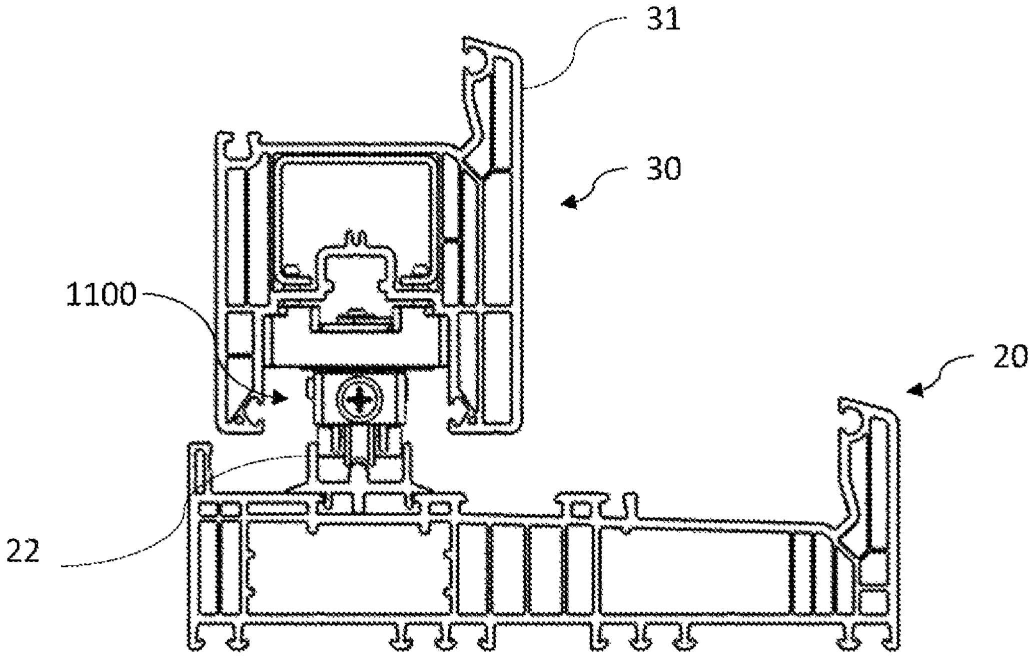
FIG. 2 is a lateral cross-sectional view showing the state in which horizontal contact is released in a windows and doors assembly according to the present disclosure.

When the end portion 41 (the opposite side to the rotation portion 42) of the handle 40 is directed in a horizontal direction, the horizontal contact state between the window frame 31 and the windowsill 20 may be released, and an arrangement relationship between the window 30 and the windowsill 20 is shown in FIG. 2.

However, in this case, an engagement unit 300 (refer to FIG. 4) of the window 30 that will be described below is caught by an engagement unit guide 200 of the windowsill 20, and thus the window 30 may not be open.

Nonetheless, a narrow gap may be formed between the window frame 31 and the windowsill 20, and when the window frame 31 intends to be moved in an open direction, the window frame 31 rattles, but is not open due to the aforementioned caught relationship between the engagement unit 300 and the engagement unit guide 200.

Accordingly, a distance by which the window 30 is moved in this state may be a distance (e.g., 0.5 to 1 cm) by which the engagement unit 30 is slightly moved while being inserted into the engagement unit guide but is caught by the engagement unit guide and is not moved any longer.

When the end portion 41 (the opposite side to the rotation portion 42) of the handle 40 is directed downwards, the window 30 may become in a closed state. The window frame 31 and the windowsill 20 may be in a horizontal contact state, the engagement unit 200 of the window 30 may be caught by the engagement unit guide 200 formed in the windowsill 20.

Figure 3:
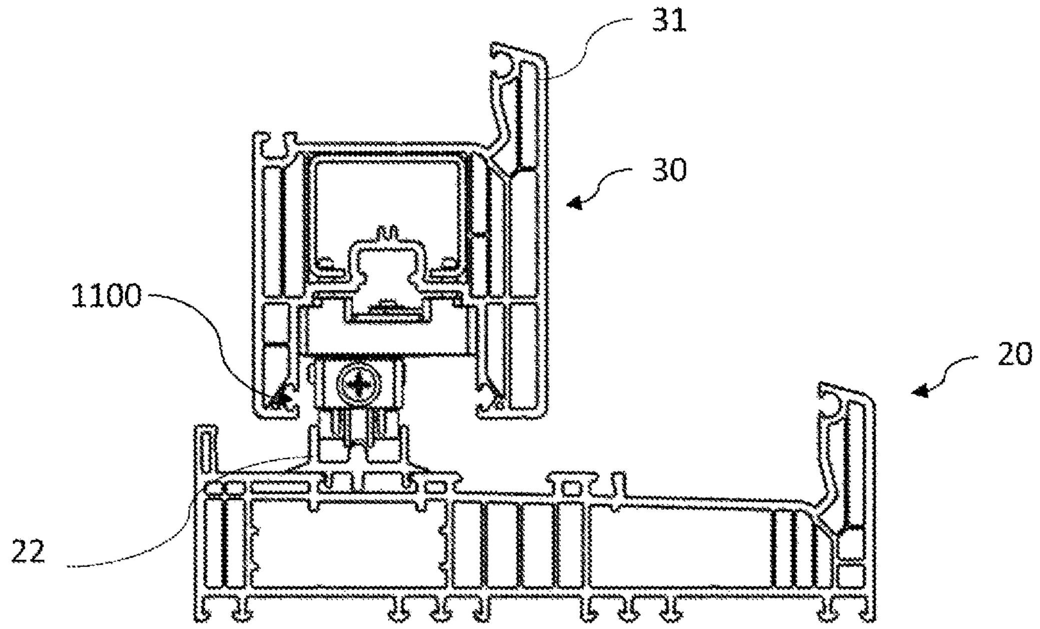
FIG. 3 is a lateral cross-sectional view showing a horizontal contact state in a windows and doors assembly according to the present disclosure.

That is, as shown in FIG. 3, the window 30 may be moved to one side (to a right side in FIG. 3) compared with the state shown in FIG. 2, and may come into contact with a wall (not shown) or a rib (not shown) on the intermediate region of the windowsill 20.

Figure 4:
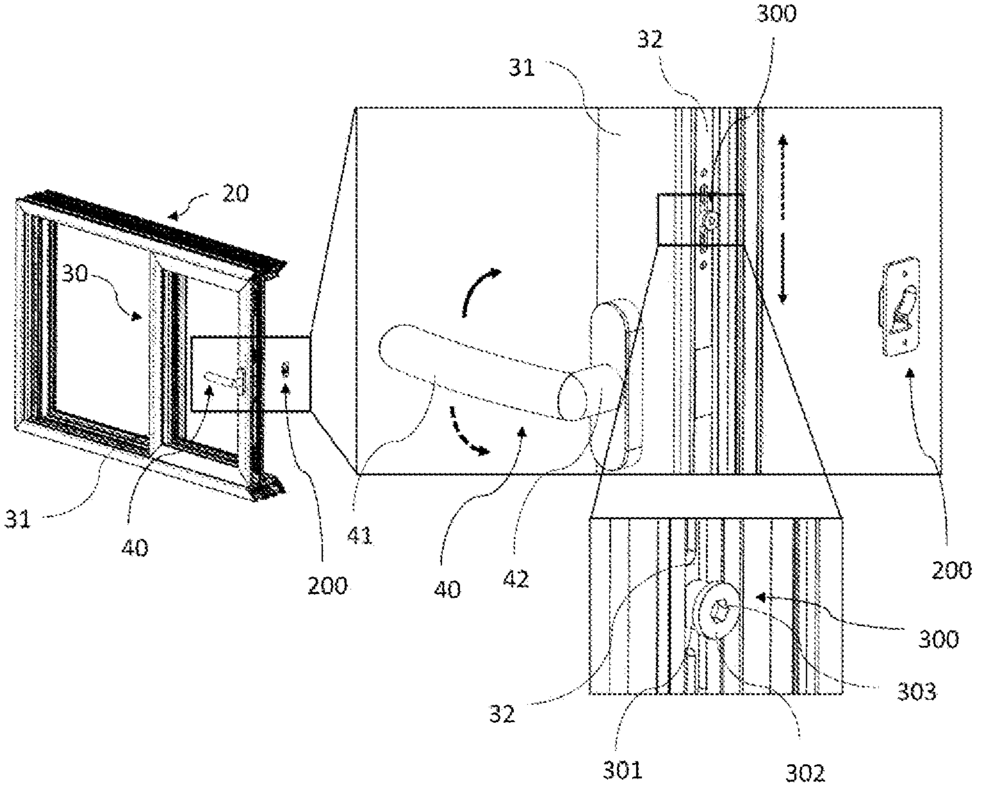
FIG. 4 is a perspective view of an engagement unit and an engagement guide of a windows and doors assembly according to the present disclosure.

As shown in FIG. 4, the handle 40 may be linked to a vertical operating bar 32 through a predetermined known connection structure. The vertical operating bar 32 may refer to a bar shaped like a long band that is provided on a lateral surface of the window frame 31 and is moveable in an upward or downward direction according to rotation of the handle 40.

The engagement unit 300 may protrude on the vertical operating bar 32, and the engagement unit 300 may include a body part 301 and an engagement step 302 that has a larger external circumference than that of the body part 301 to be formed with a step difference. Reference numeral 303 that is not described may be a wrench hole.

When the handle 40 is rotated in a downward direction (in a direction indicated by a dotted arrow) in order to execute a closing function of the window 30, the vertical operating bar 32 and the engagement unit 300 connected thereto may be moved upwards.

When the handle 40 is rotated in an upward direction (in a direction indicated by a solid arrow) in order to execute an opening function of the window 30, the vertical operating bar 32 and the engagement unit 300 connected thereto may be moved downwards.

Figure 5:
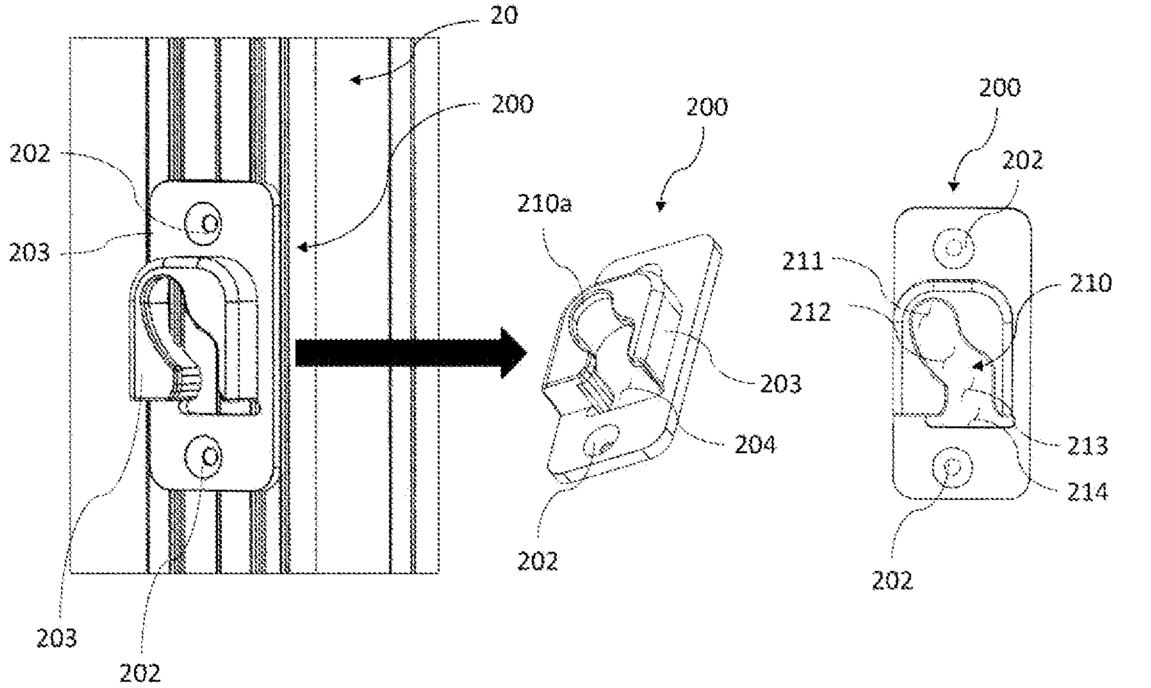
FIG. 5 is a perspective view and a front view of an engagement guide of a windows and doors assembly according to the present disclosure.

The engagement unit guide 200 may be provided at an opposite side to the engagement unit 300. As shown in FIG. 5, the engagement unit guide 200 may be fixed to an internal surface of the windowsill 20. The engagement unit guide 200 may include a fixing plate 201 including an insertion hole 202 in which a screw is inserted, a protrusion housing 203 that protrudes forwards from the fixing plate 201, and an engagement groove 210 that is provided in the protrusion housing 203, is inserted into the engagement unit 300, and then, is caught by the engagement step 302 of the engagement unit 300.

The engagement groove 210 may include an upper groove 211 at an uppermost end, an intermediate groove 212 connected to a lower portion of the upper groove 211, and a lower groove 213 connected to a lower portion of the intermediate groove 212. An opening 214 that is open and penetrates may be formed in the lowermost end of the engagement groove 210, that is, the lowermost end of the lower groove 213.

The upper groove 211 may be inclined in one direction compared with the lower groove 213, and the direction in which the upper groove 211 is inclined may correspond to a direction in which the window 30 comes into horizontal contact with the windowsill 20.

In order to horizontally move the window 30, the engagement unit 300 attached to the window 30 needs to be smoothly moved in the engagement groove 210. In particular, the engagement unit 300 needs to be smoothly moved between the upper groove 211 and the lower groove 213.

To this end, the engagement unit 300 may be smoothly moved by forming the intermediate groove 212 to be inclined, and the intermediate groove 212 may be a cam groove by forming an inclined line of the intermediate groove 212 as a curve instead of a straight line.

When the engagement unit 300 is inserted into the engagement groove 210, the engagement step 302 at an end of the engagement unit 300 may be caught by a protrusion edge **210*a* of the engagement groove 210. The protrusion edge 210*a* may be formed in an extension, a flange, or a step difference, which extends along an internal side of the engagement groove 210**.

When being caught by the protrusion edge **210*a*, the engagement step 302 may be prevented from being separated in a forward direction, and in this state, it may not be possible to open the window 30**.

A lower portion of the engagement groove 210 may be open by the opening 214, and thus, when the engagement unit 300 in the lower groove 213 descends, the engagement unit 300 may be moved to a lower space and may not be caught by the engagement groove 200 any longer.

In this state, when the window 30 is moved, the engagement unit 300 may not be confined by the engagement unit guide 200, and thus the window 30 may be smoothly open.

Figure 6:
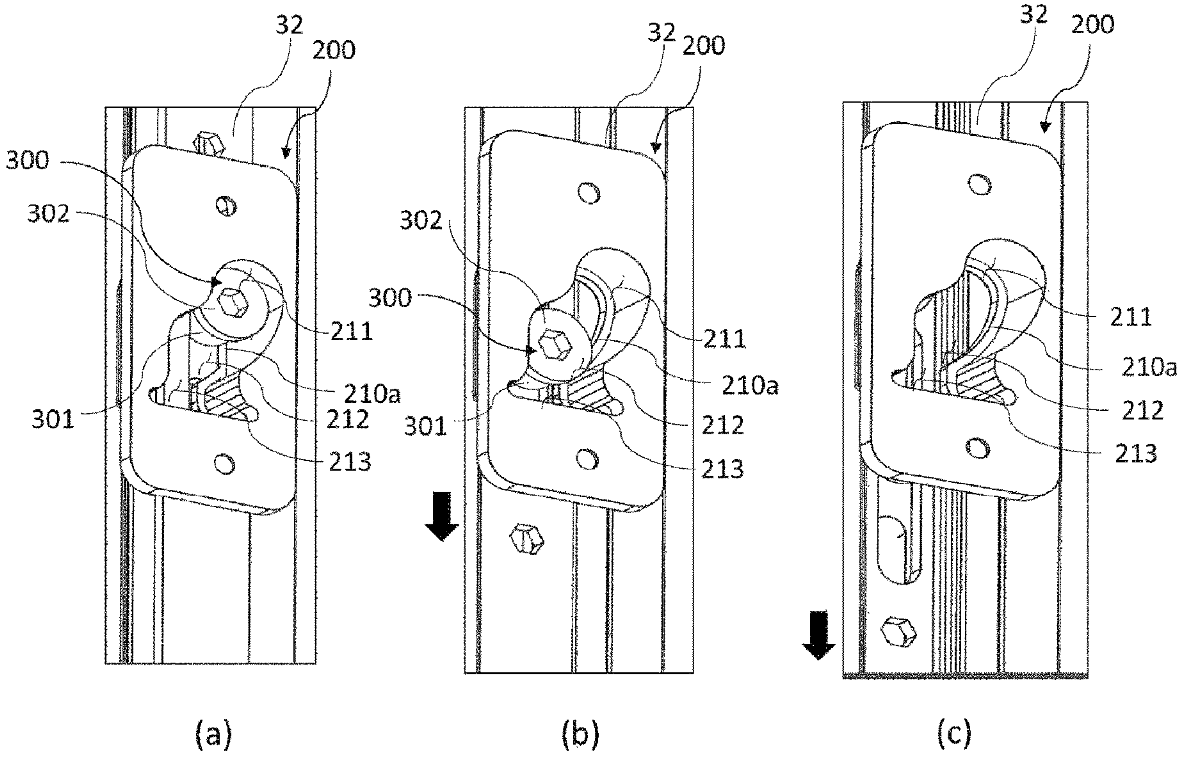
FIG. 6 is a perspective view of a mutual operation between an engagement unit and an engagement guide in a windows and doors assembly according to the present disclosure.
Figure 7:
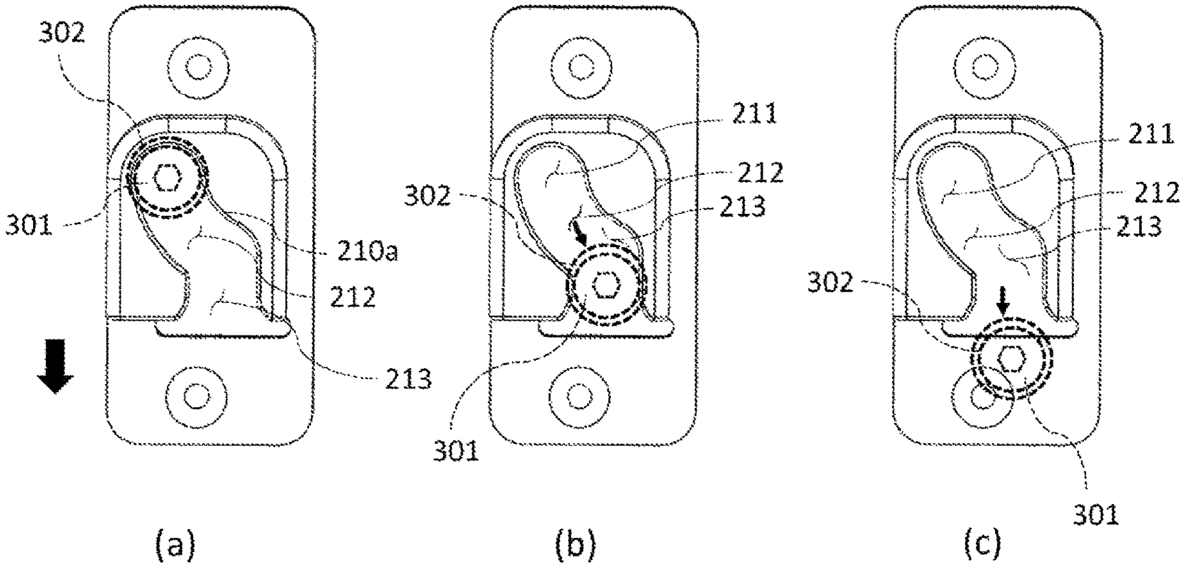
FIG. 7 is a front view showing a mutual operation between an engagement unit and an engagement guide in a windows and doors assembly according to the present disclosure.

As shown in FIGS. 6A and 7A, when the engagement unit 300 is positioned in the upper groove 211, the window 30 may come into horizontal contact with the windowsill 20, and the engagement step 302 of the engagement unit 300 may be caught by a region of the upper groove 211 of the edge **210*a*, and accordingly, it is absolutely impossible to open the window 30, and there is no horizontal gap between the window 30 and the windowsill 20**.

In this state, introduction of the outside air may be completely interrupted.

In this state, when the handle 40 is rotated by slowly moving upwards, the engagement unit 300 may be positioned in the intermediate groove 212 while the horizontal contact state of the window 30 is released as shown in FIG. 2.

In this state, the engagement step 302 of the engagement unit 300 may also be caught by the internal edge **210*a* in a region of the intermediate groove 212**, and thus may be prevented from being separated.

When the handle 40 is rotated by 90 degrees to become in a horizontal state, the engagement unit 300 may be positioned in the lower groove 213 as shown in FIGS. 6B and 7B. In this case, the engagement step 302 of the engagement unit 300 may also be caught by the protrusion edge 210*a* in the lower groove 312, and thus may be prevented from being separated.

However, the horizontal contact state may be released, and the windowsill 20 and the window 30 may be horizontally spaced apart from each other to form a slight gap, and when the window 30 intends to be moved, the window 30 may be shaken while rattling, and accordingly, slight gaps may also be generated between the lateral surface of the window 30 and the internal surface of the windowsill 20, thereby enabling ventilation through the gaps.

When the handle 40 is rotated upwards in the horizontal state of the handle 40, the engagement unit 300 may descend and may deviate from the lower groove 213, and the engagement step 320 may deviate the state in which the engagement step is caught by the protrusion edge 210*a* of the engagement groove and may not be caught by any part, as shown in FIGS. 6C and 7C.

Accordingly, when a user opens the window 30, the window 30 may be moved along the rail and may be open.

A horizontal moving device 1100 for causing a horizontal contact operation or a horizontal contact release operation of the window 30 will be described.

Figure 8:
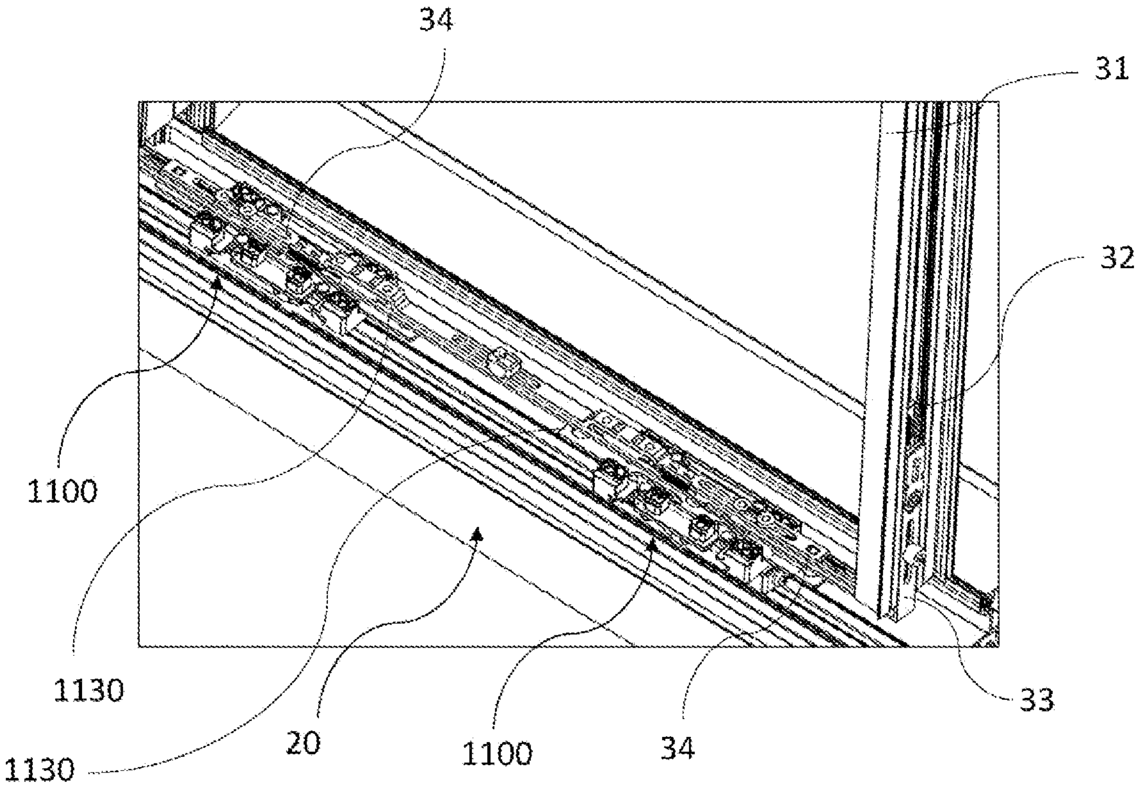
FIG. 8 is a diagram showing the state in which a horizontal contact device is installed in a windows and doors assembly according to the present disclosure.

FIG. 8 is a diagram showing a structure of internal components when a lower region of the window frame 31 is removed. A horizontal operating bar 34 connected to the vertical operating bar 31 may be arranged below the window frame 31 in a longitudinal direction of the window frame 31.

A first connection operating bar 33 bent in the form of 'L' may be provided at a corner edge of the window frame 31 and may connect the vertical operating bar 34 and the vertical operating bar 32.

A plurality of horizontal moving devices 1100 may be spaced apart from each other, horizontal operating bars 34 may be connected to the horizontal moving devices 1100, respectively, and the horizontal operating bars 34 may be connected to each other by a second connection operating bar 35 that is horizontally disposed and may be moved together.

The horizontal operating bar 34 may be connected to the horizontal moving device 1100, and in particular may be connected to a straight moving member 1130 of the horizontal moving device 1100.

Thus, when the handle 40 is rotated, the vertical operating bar 32 and the engagement unit 300 may be moved in upward and downward directions, and thus, the horizontal operating bar 34 may be moved in a horizontal direction, and the straight moving member 1130 connected thereto may also be moved in a horizontal direction.

Figure 9:
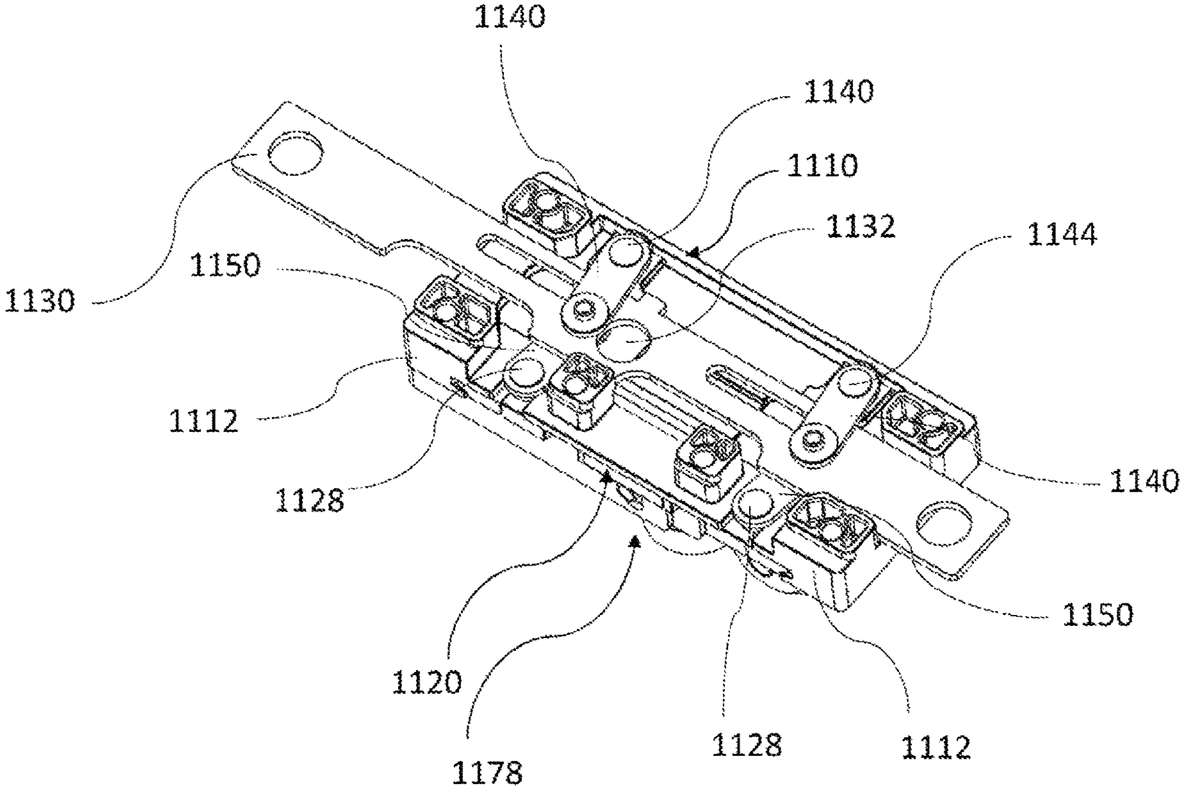
FIG. 9 is a top-perspective view of a horizontal contact device of a windows and doors assembly according to the present disclosure.
Figure 10:
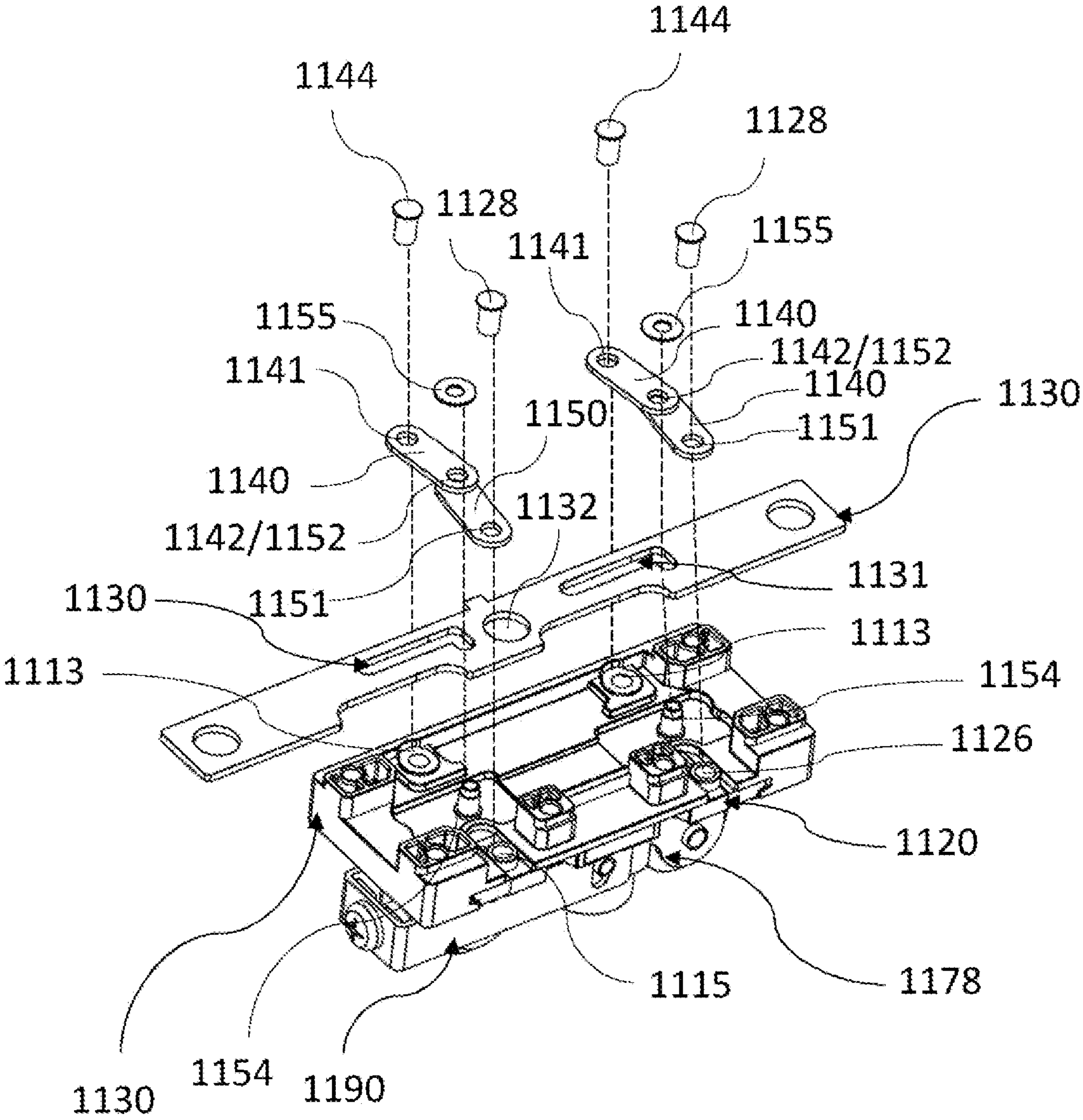
FIG. 10 is a partial exploded perspective view of a horizontal contact device of a windows and doors assembly according to the present disclosure.
Figure 11:
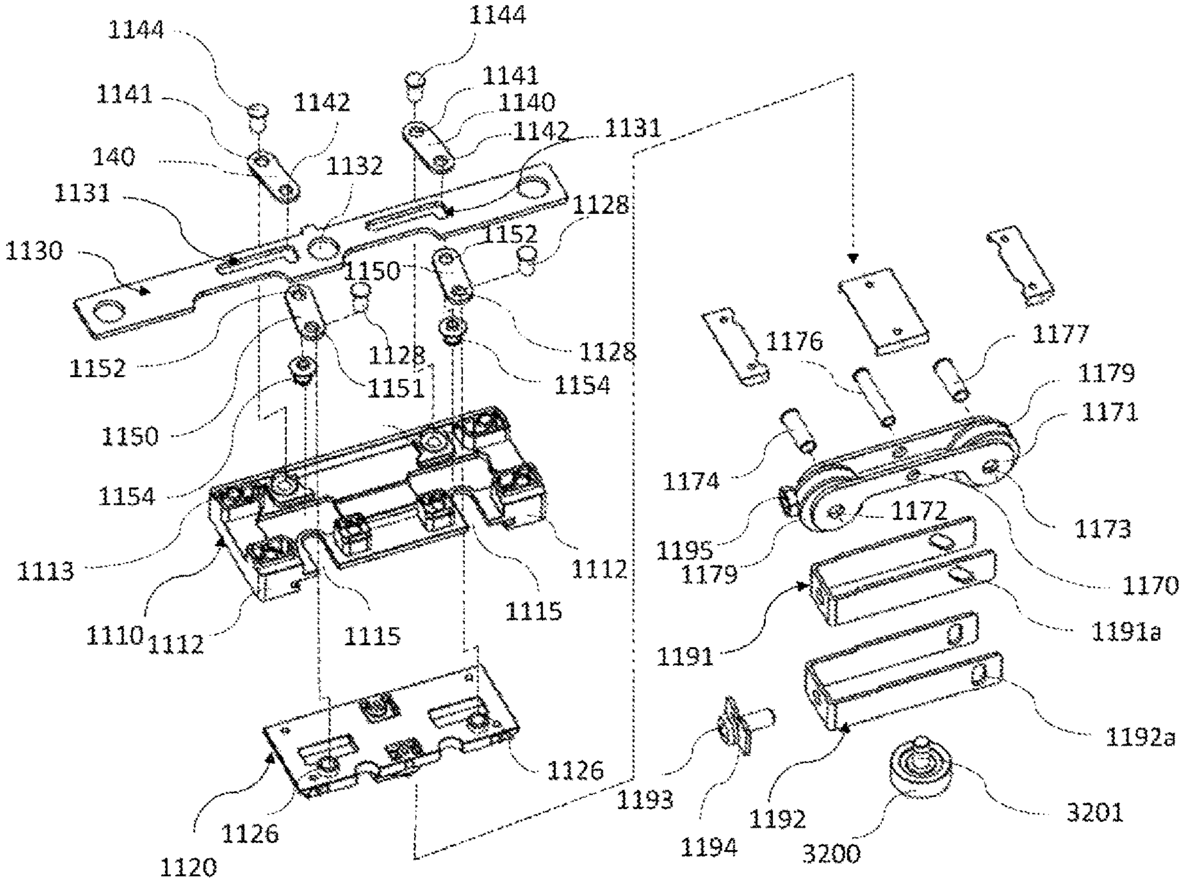
FIG. 11 is an entire exploded perspective view of a horizontal contact device viewed from the above of a windows and doors assembly according to the present disclosure.

As shown in FIGS. 9 to 11, the horizontal moving device 1100 may include a fixing plate 1110 connected to the window 30, and a moving plate 1120 that is disposed on the fixing plate 1110 to be relatively moved in a horizontal direction in which the window 30 comes into contact with or is moved apart from the windowsill 20 and includes a moving unit 178 installed to be moved along a rail (not shown) of the windowsill.

The horizontal moving device 1100 may include the straight moving member 1130 that is connected to the fixing plate 1110 and is straightly moved by a predetermined distance by moving an operating bar (not shown) of the window 30, and operating links 1140 and 1150 that horizontally move the moving plate 1120 with respect to the fixing plate 1110 by straightly moving the straight moving member 1130.

The fixing plate 1110 may be fixedly installed on the window 30, and the moving plate 1120 may be moveably disposed on the fixing plate 1110.

The moving plate 1120 may be disposed on the fixing plate 1110 to be moved in a horizontal direction in which the window 30 comes into contact with or is moved apart from the windowsill 20. The moving plate 1120 may include a moving unit 1178 that is moveably installed along a rail (not shown) of the windowsill.

Thus, the handle 40 (refer to FIG. 1) may be manipulated downward to move an end portion thereof downwards and to fix the window 30 to come into contact with the windowsill 40, which may be performed through relative horizontal movement between the moving plate 1120 and the fixing plate 1110.

In this case, the moving plate 1120 may be connected to the rail (not shown) of the windowsill 20 through the aforementioned moving unit 1178, and thus the fixing plate 1110 may be relatively moved in a direction in which the fixing plate 1110 comes into contact with the windowsill 20.

As a result, the window 30 to which the fixing plate 110 is connected may come into contact with the windowsill 20.

When the handle 40 is moved upwards to move an end portion thereof upwards or is manipulated in a horizontal state, the fixing plate 110 may be relatively moved spaced apart from the windowsill 20 to open the window.

The fixing plate 1110 may include a guide portion 1112 for guiding the moving plate 1120 to be moved.

That is, opposite end portions of the moving plate 120 may be confined in a vertical direction (a longitudinal direction) by the guide portion 1112, in which case the moving plate 1120 may be accommodated in the guide portion 1112 to be horizontally moved.

Thus, as described below, the moving plate 1120 and the fixing plate 1110 may be relatively moved therebetween by moving the straight moving member 1130.

When the aforementioned moving plate 1120 is disposed on a bottom surface of the fixing plate 1110, the straight moving member 1130 may be connected to a top surface of the fixing plate 1110.

The straight moving member 1130 may be installed to be linked to the horizontal operating bar 34 installed on the window and to be moved in the same direction in which the horizontal operating bar 34 is moved.

In this case, the straight moving member 1130 may be linked to the horizontal operating bar 34 in a section in which the window is horizontally moved, that is, a section until the window 30 comes into contact with the windowsill 20 after substantially starting horizontal movement according to rotation and manipulation of the handle 40.

According to the present embodiment, for the link structure of the horizontal operating bar 34 and the straight moving member 1130, an operating hole 1132 into which an operating pin (not shown) of the horizontal operating bar 34 is inserted and is guided may be formed in the straight moving member 1130.

When the operating hole 1132 is shaped like a circle and the handle 40 of the window is rotated, the straight moving member 1130 may be immediately moved or the handle 40 of the window may be rotated and simultaneously the straight moving member 1130 may be moved.

Accordingly, the window may come into contact with the windowsill (when the current mode is switched to a lock mode from a ventilable mode) or may be moved apart from the windowsill (when the current mode is switched to the ventilable mode from the lock mode) by rotating the handle of the window by 90 degrees only rather than rotating the handle of the window by 180 degrees like in a conventional case.

The fixing plate 1110 and the straight moving member 1130 may be connected to each other through the first link 1140, and the moving plate 1120 and the straight moving member 1130 may be connected to each other through the second link 1150.

For example, one end of the first link 1140 may be connected, and the other end of the first link 1140 may be connected to the straight moving member 1130. In addition, one end of the second link 1150 may be connected to the moving plate 1120, and the other end of the second link 1150 may be connected to the straight moving member 1130.

In this case, the first link 1140 and the second link 1150 may be arranged to be symmetric about the straight moving member 1130. Then, the first link 1140 and the second link 1150 may be installed to be inclined with respect to a direction in which the straight moving member 1130 is straightly moved and may have a predetermined operation angle.

Thus, the operation angle may be changed as the straight moving member 1130 is straightly moved, and thus the fixing plate 1110 and the moving plate 1120 may be relatively moved.

In this case, the first link 1140 and the second link 1150 may be disposed at opposite sides of the straight moving member 1130 across the straight moving member 1130, may have the same condition of location with respect to the straight moving member 1130, and may have the same length, and the moving plate 1120 and the fixing plate 110 may be relatively moved in a horizontal direction (in a perpendicular direction to a direction in which the window is moved).

In this case, a first connection hole 1141 may be formed at one end of the first link 1140, and a first hinge pin 1144 may penetrate the first connection hole 1141 and may be fixed to a first fixing hole 1113 of the fixing plate 1110.

A second connection hole 1151 may be formed at one end of the second link 1150, and a second hinge pin 1154 may penetrate a second fixing hole 1126 of the moving plate 120 and may be fixed to the second connection hole 1151.

In this case, a recess 1115 shaped like a long groove through which the second hinge pin 1154 passes may be provided on the fixing plate 1110.

That is, the second hinge pin 1154 may be disposed to simply pass through the recess 1115 and may not be coupled or connected to the fixing plate 1110.

The first link 1140 and the other end of the second link 1150 may be connected to each other through one connection pin 1154 installed to penetrate the straight moving member 1130. That is, the connection pin 1154 may connect a third connection hole 1142 formed at the other end of the first link 1140 and a fourth connection hole 1152 formed at the other end of the second link 1150 to each other.

Thus, force applied by moving the straight moving member 1130 may be as uniformly as possible transferred to the fixing plate 1110 and the moving plate 1120 connected to one end of the first link 1140 and the second link 1150.

The straight moving member 1130 may include a guide hole 1310 formed therein, into which the connection pin 1154 for connecting the first link 1140 and the second link 1150 to each other is inserted and which guides movement of the connection pin 1154 by moving the straight moving member 1130.

The guide hole 1131 may guide the connection pin 1154 for connecting the first link 1140 and the second link 1150 to each other when the straight moving member 1130 is moved.

A fixing washer 1155 may be provided at a top portion of the connection pin 1154 to prevent the connection pin 1154 and the guide hole 1310 from being separated from each other.

Figure 12:
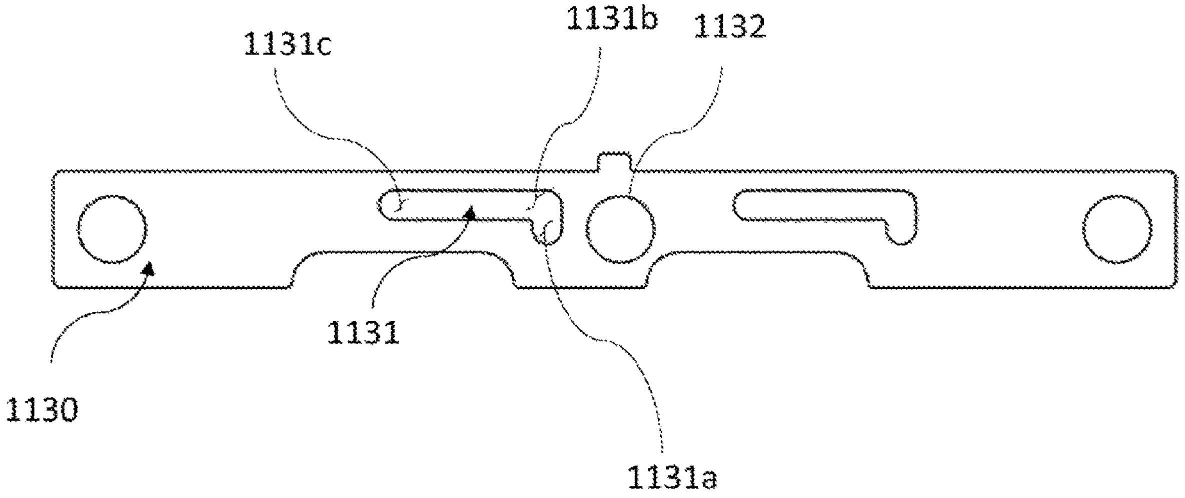
FIG. 12 is a plan view of a straight moving member of a windows and doors assembly according to the present disclosure.

As shown in FIG. 12, the guide hole 1131 may include straight moving paths 1131*b* and 1131*c* that is parallel to a moving direction of the straight moving member 1130, and an extension moving path 1132*a* that extends in a different direction from the straight moving paths 1131*b* and 1131*c*.

A direction in which the extension moving path 1132*a* is formed may be orthogonal or perpendicular to the straight moving paths 1131*b* and 1131*c*, but the present disclosure is not limited thereto.

Although described below, when the connection pin 1154 is put on the extension moving path 1131*a*, the window may become in a closing mode, when the connection pin 1154 is put on the first straight moving path 1131*b*, the window may become in a ventilable mode, and when the connection pin 1154 is put on the second straight moving path 1131*c*, the window may become in an opening mode.

The moving unit 1178 included in the moving plate 1120 may include a guide roller 3200 and a wheel 1179 that are moveably installed along a rail (not shown) of the windowsill 20.

When the size of the window and the size of the windowsill are standardized and provided, an error may occur due to an intended tolerance or the like. In this case, the moving unit 1178 included in the window may not come into accurate contact with the rail of the windowsill 20, which acts as a factor for impeding movement of the window.

Thus, the moving unit 1178 of the windows and doors assembly according to the present disclosure may include a height adjuster 1190 that is included in the moving plate 1120 and adjusts the height of the moving unit 1178.

The height adjuster 1190 may adjust the height of the moving unit 1178 including the wheel 1179 to bring the moving unit 1178 into accurate contact with the rail of the windowsill.

Figure 13:
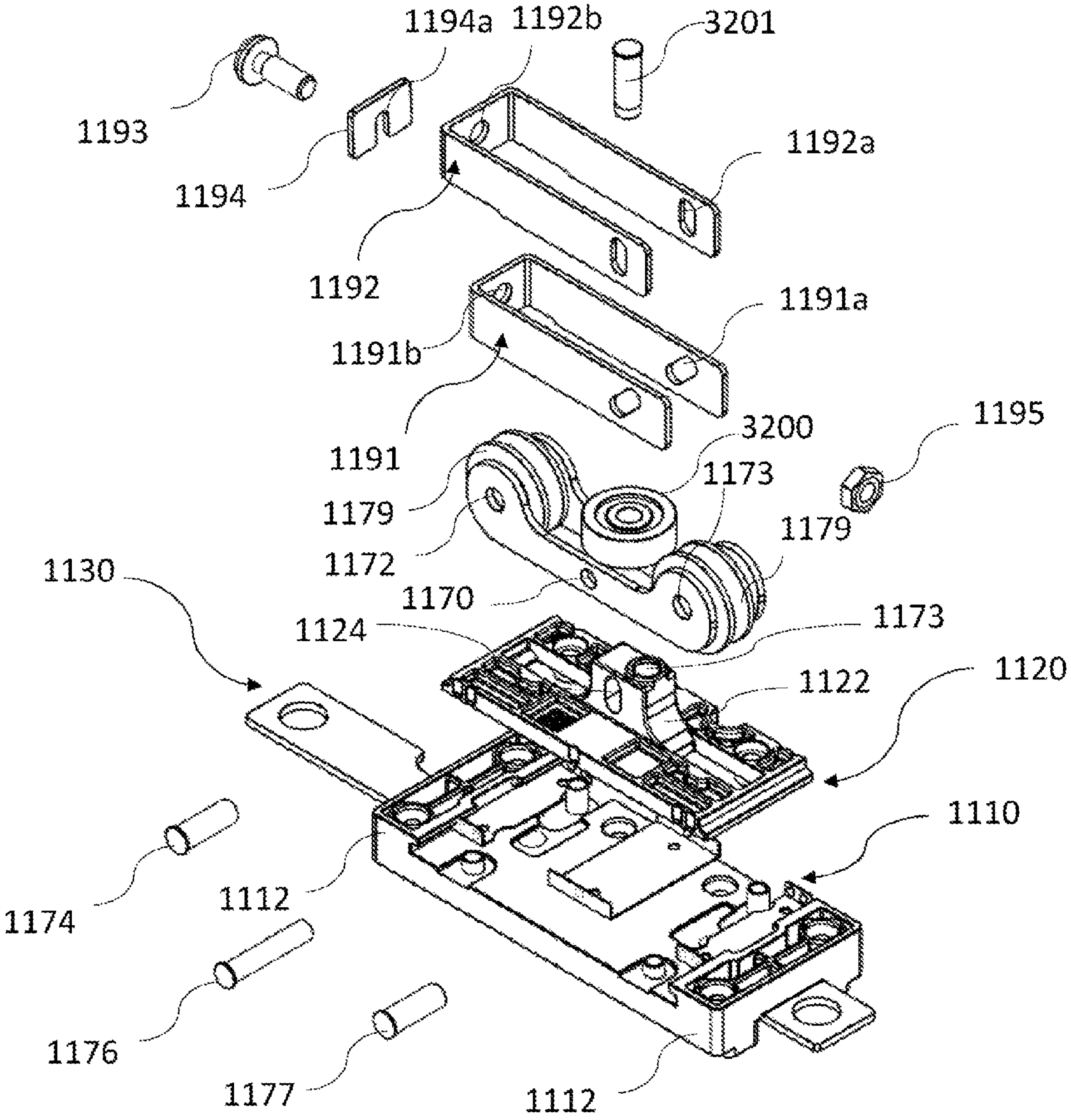
FIG. 13 is an entire exploded perspective view of an inverted structure of a horizontal contact device of a windows and doors assembly according to the present disclosure.
Figure 14:
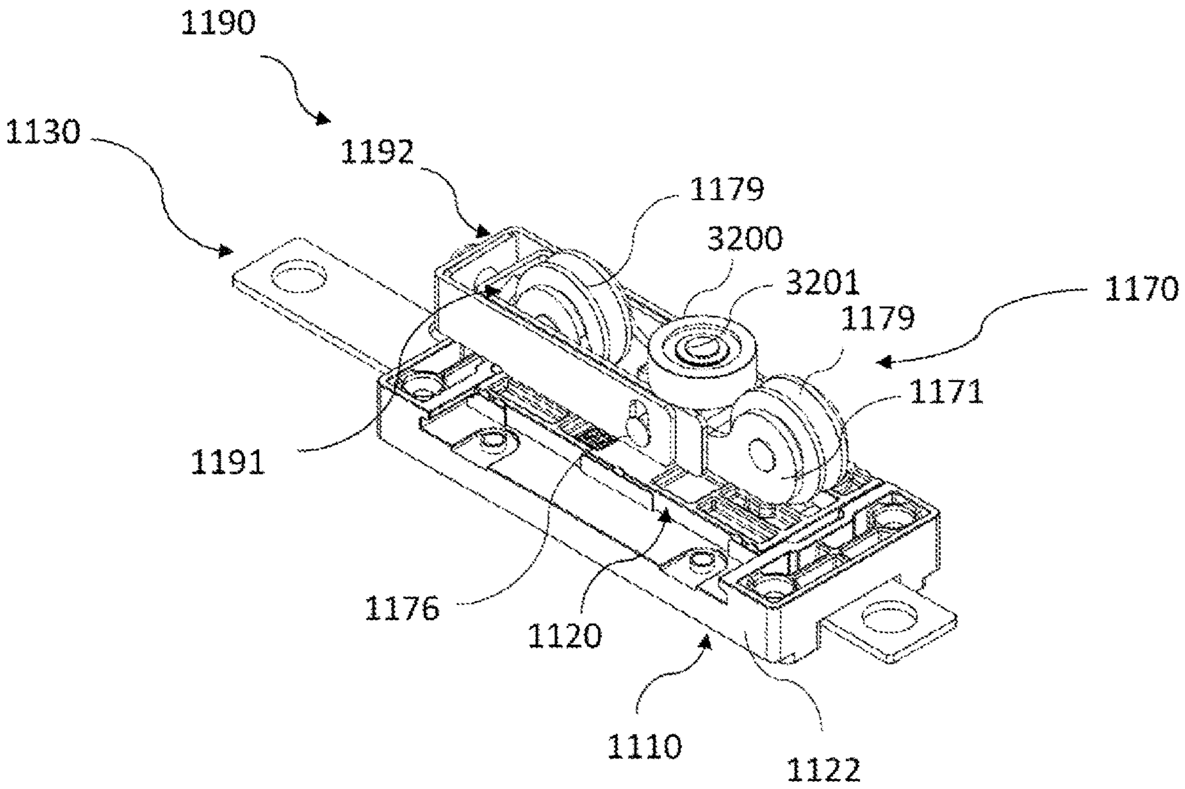
FIGS. 14 and 15 are perspective views of an inverted structure of a horizontal contact device of a windows and doors assembly according to the present disclosure.

As shown in FIGS. 13 and 14, when the moving unit 1178 includes the wheel 1179, the wheel 1179 may be provided in one pair, and wheel support plates 1171 may be disposed at the one pair of wheels 1179, respectively.

When the wheels 1179 are arranged in one line, the wheel support plates 1171 may rotatably fix the wheels 1179 at the opposite sides.

In this case, the wheel support plates 1171 may include through holes 1172 and 1173 formed therein, which penetrate rotation shafts 1174 and 1177 of the wheels 1179 and are connected to the wheel support plates 1171. When one pair of wheels 1179 is included, rotation shafts 1174 and 177 and the through holes 1172 and 1173 may be formed in one pair.

A support shaft 1176 for fixing the wheel support plates 1171 may penetrate a central portion of the wheel support plates 1171. The support shaft 1176 may penetrate a central through hole 1170 of the wheel support plate 1171.

The height adjuster 1190 may be connected to a protrusion 1122 that protrudes towards the moving unit 1178 from the moving plate 1120 and that the support shaft 1176 of the moving unit 1178 penetrates and may adjust a height.

Although the protrusion 1122 is illustrated as being integrated into the moving plate 1120, the protrusion 1122 and the moving plate 1120 may be configured as separate coupling structures.

The protrusion 1122 may include a vertical guide hole 1124 formed therein, which guides the support shaft 1176 of the moving unit 1178 to be vertically moved in upward and downward directions and that the support shaft 1176 penetrates.

The vertical guide hole 1124 may be formed in a vertical or in upward and downward directions, and when the support shaft 1176 is moved in upward and downward directions, the vertical guide hole 1124 may guide the support shaft 1176, as described below.

A support hole 1123 in which a support pin 3201 for supporting the guide roller 3200 is fixedly installed may be provided at an end of the protrusion 1122.

The height adjuster 1190 may include an internal housing 1191 shaped like and surrounds the wheel 1179 and the wheel support plates 1171, and an external housing 1192 that surrounds the internal housing 1191.

The internal housing 1191 and the external housing 1192 may be connected through an adjusting screw 1193 to adjust an interval therebetween, a guide plate 1194 that is inserted into the adjusting screw 1193, guides movement of the adjusting screw 1193, and reinforces strength may be provided on the outside of the external housing 1192, and a guide groove 1194*a*, one side of which is open, may be formed on the guide plate 1194. A screw thread of the adjusting screw 1193 may pass through the guide groove 1194*a*.

An inclined guide groove 1191*a* may be provided on the internal housing 1191, a vertical guide groove 1192*a* may be provided on the external housing 1192, and the support shaft 1176 may penetrate the inclined guide groove 1191*a* and the vertical guide groove 1192*a*.

A screw support 1195 configured in a nut, in which the adjusting screw 1193 is rotatably installed, may be formed in a short side of the internal housing 1191, and an external through hole 1192*b* and an internal through hole 1191*b* that the adjusting screw 1193 penetrate may be formed in a short side of the external housing 1192 and a short side of the internal housing 1191, respectively.

A screw thread tap may be formed in both the external through hole 1192*b* and the internal through hole 1191*b*.

Thus, when a user turns the adjusting screw 1193, a distance between the external housing 1192 and the internal housing 1191 may be changed, the inclined guide groove 1191*a* and the vertical guide groove 1192*a* may be relatively moved, and the support shaft 1176 disposed between the inclined guide groove 1191*a* and the vertical guide groove 1192*a* may be moved in an upward or downward direction along the inclined guide groove 1191*a*.

Figure 15:
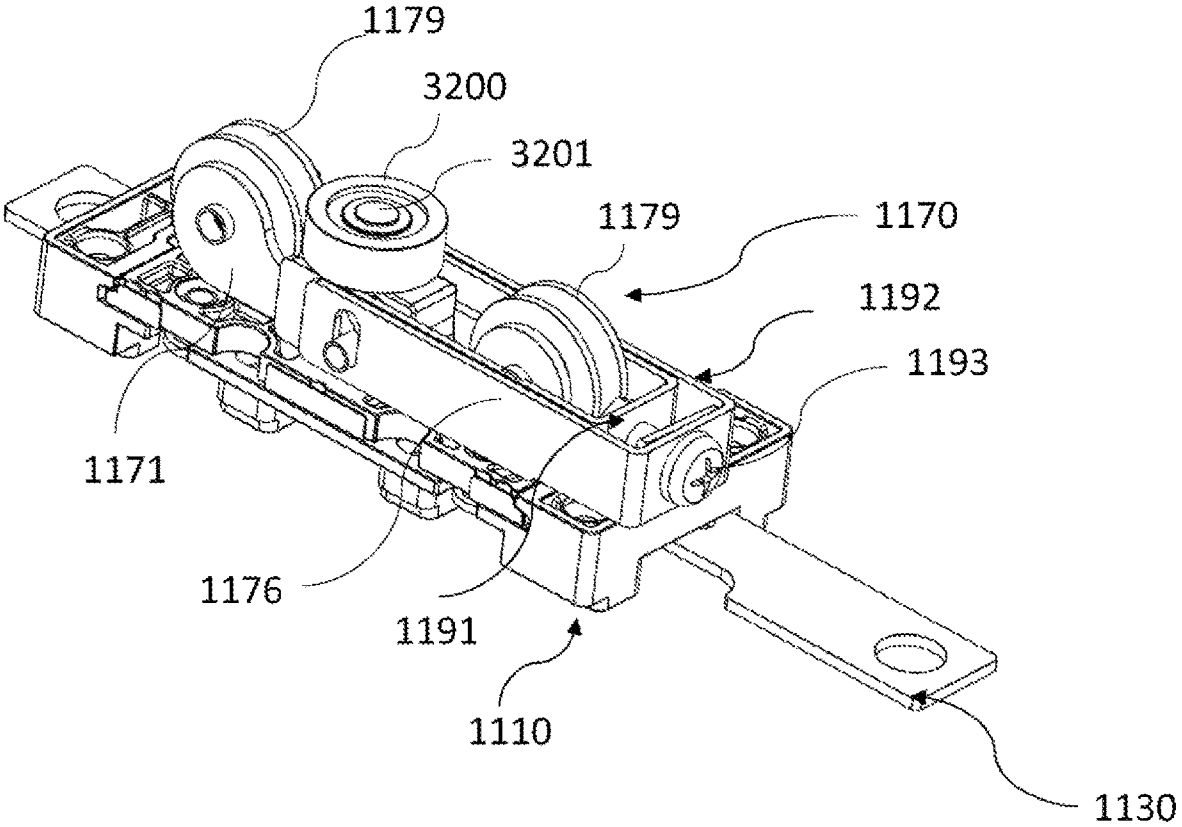
Figure 16:
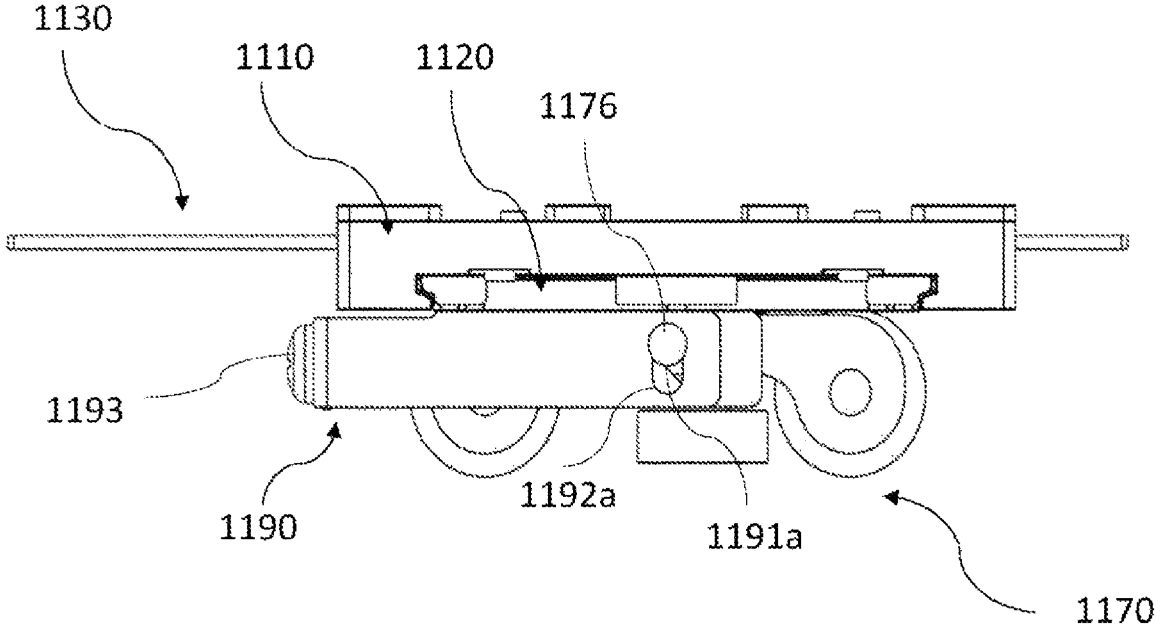
FIG. 16 is a side view of a horizontal contact device of a windows and doors assembly according to the present disclosure.
Figure 17:
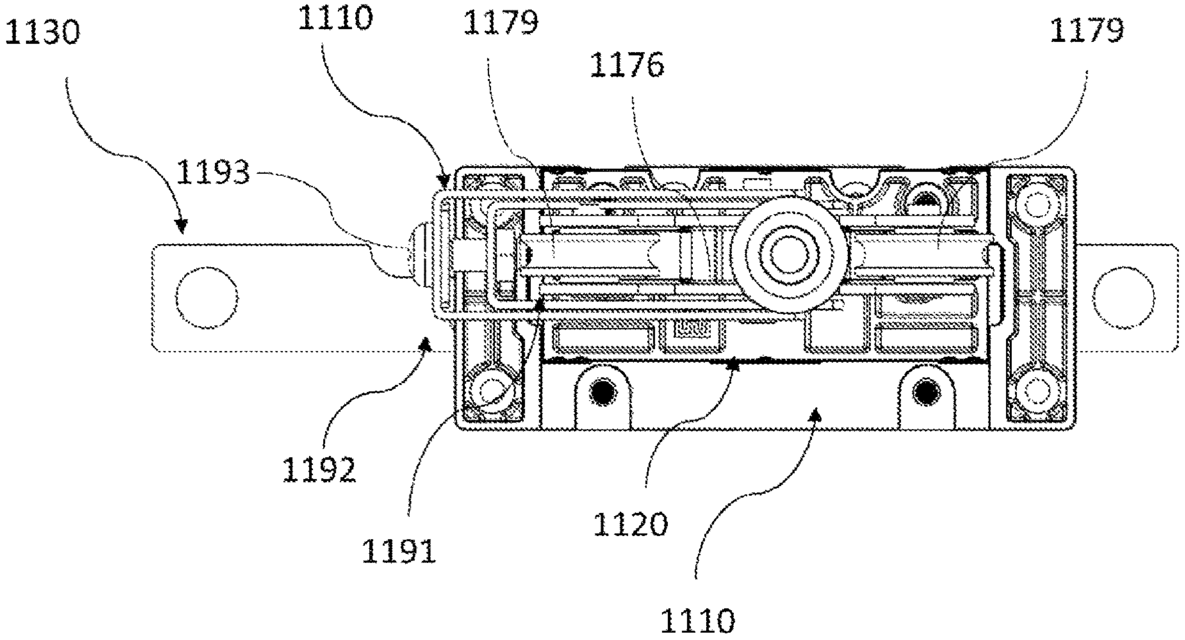
FIG. 17 is a bottom view of a horizontal contact device of a windows and doors assembly according to the present disclosure.

That is, in the state of FIGS. 15 and 16, when the internal housing 1191 approaches the external housing 1192 by turning the adjusting screw 1193, the support shaft 1176 may be positioned in a lower region of an intermediate inclined surface of the inclined guide groove 1191*a* and may descend upwards along the vertical guide groove 1192*a*.

Thus, an interval between the fixing plate 1120/the moving plate 1130 and the wheel 1179 may be increased, and thus the overall height of the horizontal moving device 1100 may be increased.

On the other hand, when the internal housing 1191 is moved apart from the external housing 1192 by turning the adjusting screw 1193, the support shaft 1176 may be positioned in an upper region of the intermediate inclined surface of the inclined guide groove 1191*a* and may ascend upwards along the vertical guide groove 1192*a*.

Thus, the interval between the fixing plate 1120/the moving plate 1130 and the wheel 1179 may be reduced, and thus the overall height of the horizontal moving device 1100 may be reduced.

As described above, the guide hole 1131 of the straight moving member 1130 includes the straight moving paths 1131*b* and 1131*c* that is parallel to a moving direction of the straight moving member 1130, and the extension moving path 1131*a* that extends in a different direction from the straight moving paths 1131*b* and 1131*c*.

As shown in FIGS. 7 and 10 to 12, the straight moving paths 1131*b* and 1131*c* may include the first straight moving path 1131*b* that is connected to the extension moving path 1131*a* and in which the connection pin 1154 for connecting the first link 1140 and the second link 1150 to each other when the engagement unit 300 is caught by the lower groove 213 of the engagement unit guide 200 is positioned, and the second straight moving path 1131*c* that is connected to the first straight moving path 1131*b* and in which the connection pin 1154 for connecting the first link 1140 and the second link 1150 to each other when the engagement unit 300 is released from the engagement unit guide 200 is positioned.

When the connection pin 1154 is positioned on the extension moving path 1131*a*, the current mode may be a horizontal contact state and a closing state or mode, the end portion 41 of the handle 40 is directed downwards (refer to FIG. 1).

When the connection pin 1154 is positioned on the first straight moving path 1131*b*, the current mode may be a state in which the horizontal contact state is released and a ventilable state or mode, and the end portion 41 of the handle 40 may be directed in a horizontal direction.

When the connection pin 1154 is positioned on the second straight moving path 1131*c*, the current mode may be a horizontal contact state release, opening, and moveable state, and an end portion of the handle 40 may be directed upwards.

Figure 18:
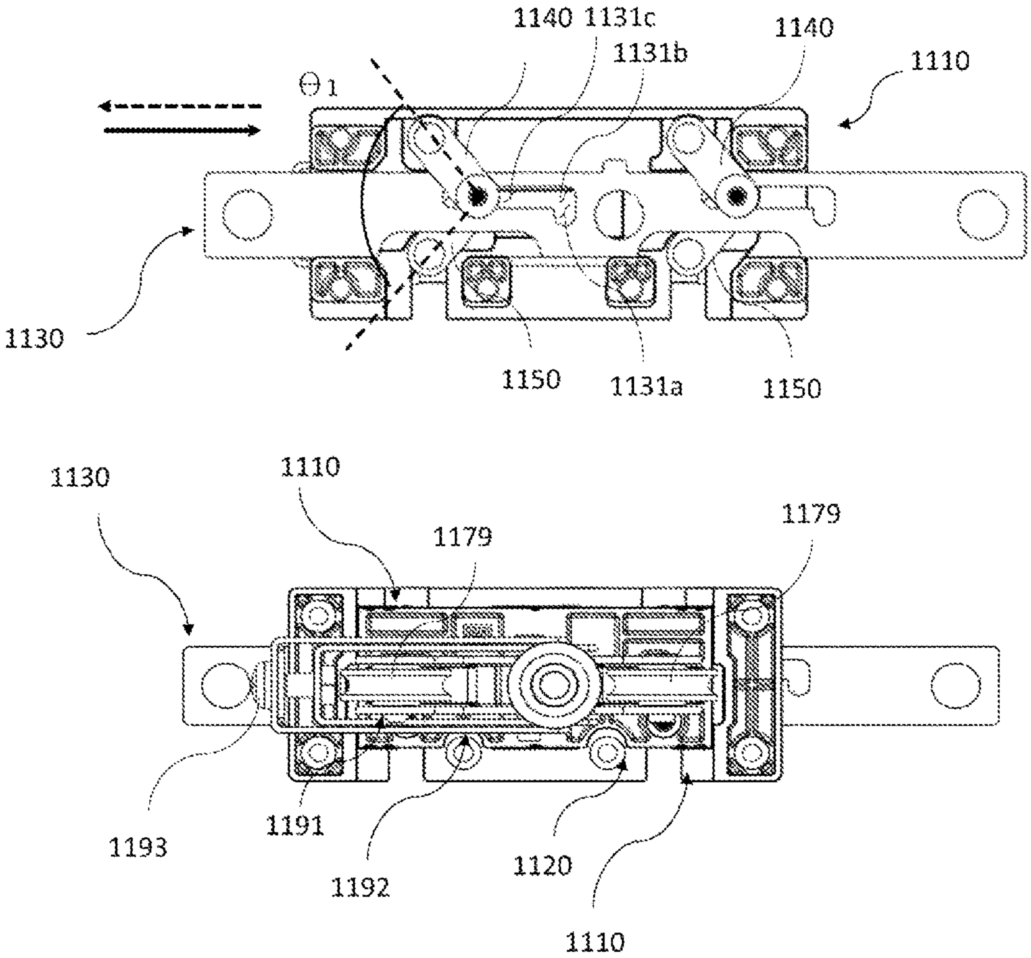
FIG. 18 is a diagram showing a state of a horizontal contact device in an opening mode in a windows and doors assembly according to the present disclosure.

As shown in FIG. 18, when a user moves the window 30 up to an end of the windowsill 20 and then rotates the handle 40 from top to bottom by 180 degrees in the state in which the window is open, the straight moving member 1130 may be moved in a direction indicated by an arrow (a dotted line).

Figure 20:
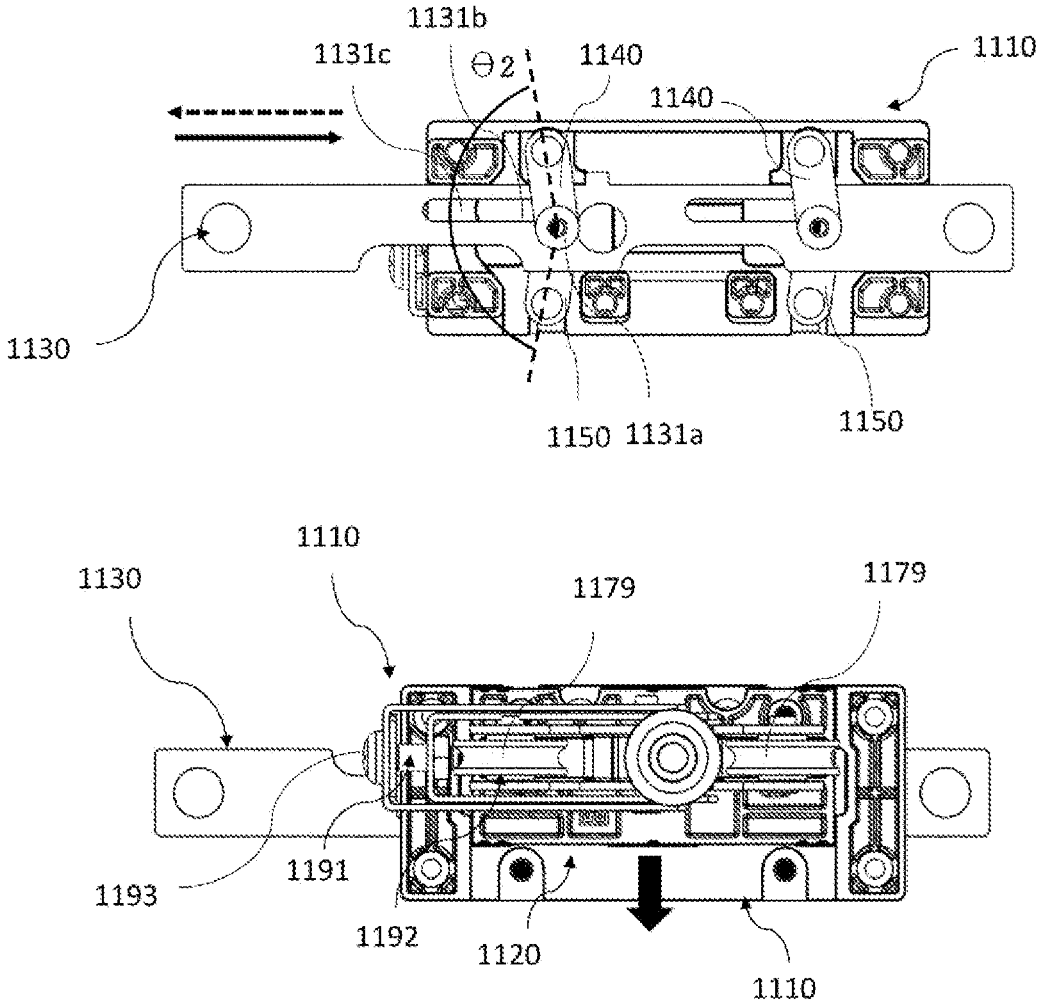
FIG. 20 is a diagram showing a state of a horizontal contact device in a closing mode in a windows and doors assembly according to the present disclosure.

In this case, as shown in FIG. 20, the connection pin 1154 that connects the first link 1140 and the second link 1150 to each other by moving the straight moving member 1130 may be guided by the guide hole 131 of the straight moving member 1130 and may be moved in a direction, in which the straight moving member 1130 is moved, to be disposed on the extension moving path 1131*a*, an operation angle θ2 between the first link 1140 and the second link 1150 may be increased, and the moving plate 1120 and the fixing plate 1110 may be relatively moved to increase a distance therebetween.

When the moving plate 1120 and the fixing plate 1120 are relatively moved to be apart from each other, the moving plate 1120 may be connected to the rail of the windowsill by the aforementioned moving unit 1178, and thus the fixing plate 1110 may come into contact with the windowsill 20 (the state of FIG. 3).

The vertical operating bar 32 may be moved as upwards as possible, and thus the engagement unit 300 may also be moved as upwards as possible and may be caught by the upper groove 211 of the engagement groove of the engagement unit guide 200 (the state of FIGS. 6A and 7A), which may be defined as a first position.

Figure 19:
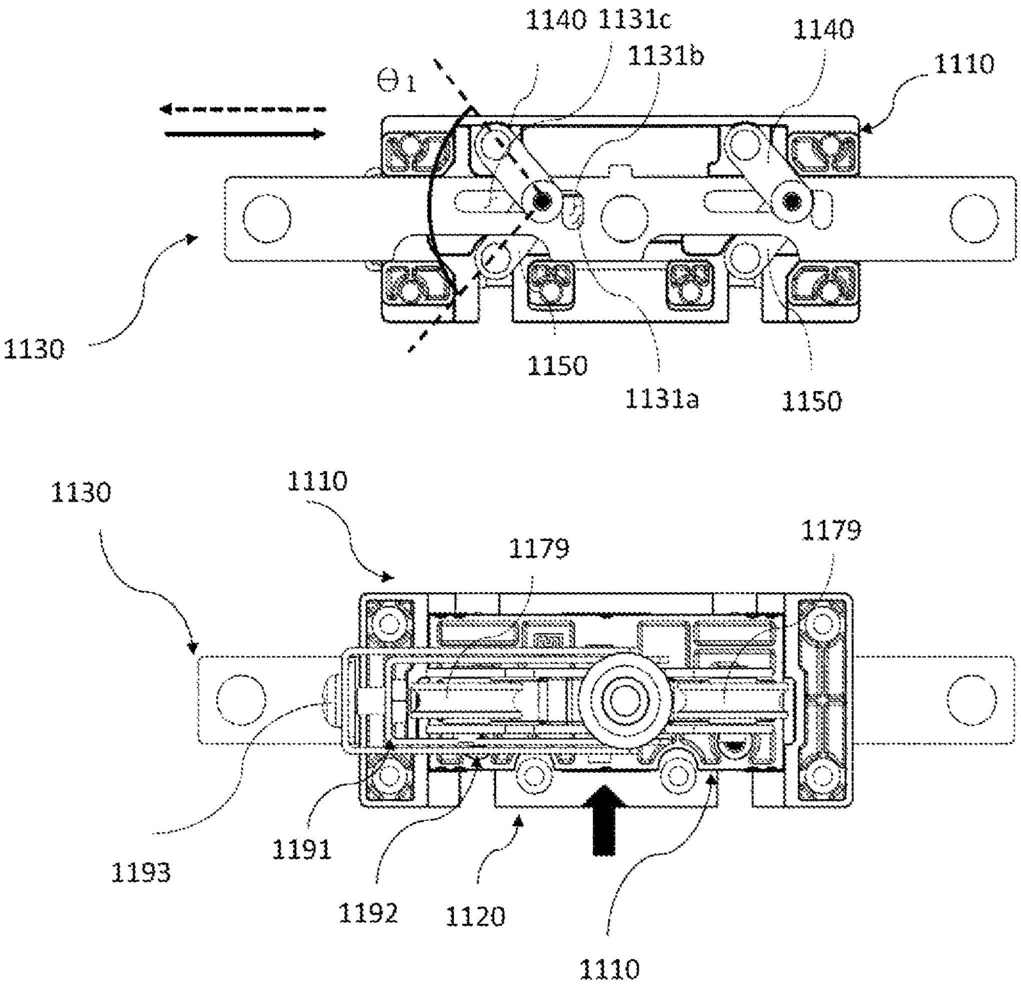
FIG. 19 is a diagram showing a state of a horizontal contact device in a ventilable mode in a windows and doors assembly according to the present disclosure.

In this state, in order to use the ventilable mode, when a user rotates the handle 40 upwards by 90 degrees and the handle 40 becomes in a horizontal state, the straight moving member 1130 may be moved in a direction indicated by an arrow (solid line), as shown in FIG. 19.

In this case, the connection pin 1154 may deviate from the extension moving path 1131*a* of the straight moving member 1130 and may be positioned on the first straight moving path 1131*b*. In addition, an operation angle $\theta_1$ between the first link 1140 and the second link 1150 may be reduced, and the moving plate 1120 and the fixing plate 1110 may be relatively moved to reduce a distance therebetween.

When the moving plate 1120 and the fixing plate 1110 become close to each other, the moving plate 1120 may be connected to the rail of the windowsill by the aforementioned moving unit 1178, and thus the fixing plate 1110 may become apart from the windowsill (the state of FIG. 2).

Then, the vertical operating bar 32 is slightly moved downwards compared with the closing state, and thus the engagement unit 300 may pass through the intermediate groove 212 of the engagement unit guide 200 and may be caught by the lower groove 213. Thus, a gap for ventilation may be formed (the state of FIGS. 6B and 7C), which may be defined as a second position.

In this state, in order to use the opening (open) state, when a user rotates the handle 40 upwards by 90 degrees and the end portion 41 of the handle is directed upwards, the straight moving member 1130 may be moved in a direction indicated by an arrow (solid line), as shown in FIG. 18.

In this case, the connection pin 1154 may deviate from the first straight moving path 1131*b* and may be positioned on the second straight moving path 1131*c*. The operation angle $\theta_1$ between the first link 1140 and the second link 1150 may be the same as that in the ventilation mode, and the horizontal contact state may be maintained to be released (refer to FIG. 2).

Then, the vertical operating bar 32 is moved more downwards than in the closing state, and thus the engagement unit 300 may be moved downwards compared with the lower groove 213 of the engagement unit guide 200, may pass through the opening 214, and may deviate from the engagement groove (the state of FIGS. 6A and 7C), which may be defined as a third position.

Accordingly, the engagement unit 300 is not confined by the engagement unit guide 200 any longer, and thus the window 200 may freely slide to be open.

While the disclosure has been particularly shown and described with reference to exemplary embodiments thereof, it will be understood by those skilled in the art that various changes in form and details may be made therein without departing from the spirit and scope of the disclosure as defined by the appended claims.

Therefore, the scope of the disclosure is defined by the appended claims.

The invention claimed is:

1. A windows and doors assembly having a ventilation function and a horizontal contact function, comprising:
- a window frame, and a windowsill in which the window frame is slidably installed;
- a handle rotatably installed on the window frame;
- an engagement unit provided on a lateral surface of the window frame, linked to movement of the handle, and moved in upward and downward directions;
- an engagement guide provided on the windowsill to face the engagement unit and configured to catch or not catch the engagement unit depending on a position of the engagement unit; and
- a horizontal moving device provided on at least one of a top surface or a bottom surface of the window frame, linked to the handle, and configured to make the window frame come into horizontal contact with the windowsill or to release horizontal contact depending on movement of the handle, wherein the horizontal moving device comprises:
- a fixing plate;
- a moving plate disposed to be relatively moved on the fixing plate in a horizontal direction in which the window comes into contact with the windowsill or is moved apart from the windowsill and comprising a moving unit moveably installed along a rail of the windowsill;
- a straight moving member that is connected to the fixing plate and is straightly moved by a predetermined distance by moving an operating bar connected to the handle of the window; and
- a pair of operating links configured to horizontally move the moving plate with respect to the fixing plate as the straight moving member is straightly moved, wherein the straight moving member comprises an operating hole into which an operating pin of the operating bar is inserted and configured to move the straight moving member immediately when the handle is rotated, and a guide hole into which a connection pin for connecting the operating links is inserted and configured to guide movement of the connection pin by moving the straight moving member, wherein when a contact state of the window with respect to the windowsill by the horizontal moving device is released while a catching operation between the engagement unit and the engagement guide is performed, it is possible to ventilate through a gap between the window and the windowsill, the window is restrictly moved to form the gap, and the window is prevented from being freely open, wherein the engagement unit comprises an engagement step formed with a step difference, wherein the engagement guide comprises a body part, an engagement groove formed on the body part, and an opening formed below the engagement groove and connected to the engagement groove, wherein the engagement groove comprises an upper groove, an intermediate groove, and a lower groove, and the upper groove is disposed to be inclined in one direction compared with the lower groove, and wherein a direction in which the upper groove is inclined corresponds to a direction in which the window frame comes into contact with the windowsill.

2. The windows and doors assembly of claim 1, wherein the intermediate groove connects the upper groove and the lower groove to each other and is diagonally formed.

3. The windows and doors assembly of claim 1, wherein, when an end portion of the handle is positioned downwards to position the engagement unit at a first position, the engagement unit is positioned on the upper groove and is caught by an edge of the upper groove, when the end portion of the handle is horizontally positioned and the engagement unit is positioned at a second position lower than the first position, the engagement unit is positioned on the lower groove and is caught by an edge of the lower groove, and when the end portion of the handle is positioned upwards and the engagement unit is positioned at a third position than the second position, the engagement unit deviates downwards from the lower groove.

4. The windows and doors assembly of claim 3, wherein, when the engagement unit is positioned at the first position, the window frame comes into contact with the windowsill and becomes in a closing state, when the engagement unit is positioned at the second position, a contact state of the window frame with respect to the windowsill is released, a slight gap between a lateral surface of the window frame and a lateral surface of the windowsill is formed, and the engagement unit is caught by the engagement guide to prevent the window from being open, and when the engagement unit is positioned at the third position, the contact state of the window frame with respect to the windowsill is released, a state in which the engagement unit is caught by the engagement guide is released, and the window frame slides with respect to the windowsill to allow the window to be open.

5. The windows and doors assembly of claim 1, wherein the operating links comprises:

a first link having one end connected to the fixing plate and another end connected to the straight moving member, and disposed to be inclined at a predetermined operating angle with respect to a straight moving direction of the straight moving member to change the operating angle as the straight moving member is straightly moved; and a second link disposed to be symmetric with the first link, having one end connected to the moving plate and another end connected to the straight moving member, and configured to change an operating angle as the straight moving member is straightly moved.

6. The windows and doors assembly of claim 1, wherein the guide hole comprises a straight moving path parallel to a moving direction of the straight moving member, and an extension moving path that extends from the straight moving path and extends in a different direction from the straight moving path.

7. The windows and doors assembly of claim 6, wherein the straight moving path comprises:

a first straight moving path connected to the extension moving path, and comprising a connection pin positioned thereon configured to connect the first link and the second link to each other in a state in which the engagement unit is caught by the lower groove of the engagement guide; and a second straight moving path connected to the first straight moving path, and comprising a connection pin positioned thereon configured to connect the first link and the second link to each other in a state in which the engagement unit is released from the engagement guide.

8. The windows and doors assembly of claim 1, further comprising:

the moving unit provided on the moving plate and comprising a plurality of wheels; and a height adjuster provided on the moving plate and configured to adjust a height of the moving unit, wherein the height adjuster comprises:

an internal housing surrounded by the moving unit and comprising an inclined guide hole into which a fixing shaft penetrating the moving unit is inserted;

an external housing surrounding the internal housing and comprising a vertical guide hole into which the fixing shaft is inserted and formed in upward and downward directions; and a height adjusting screw configured to screw the internal housing and the external housing to each other, and configured to adjust an interval between the internal housing the external housing, and to adjust a vertical height of the fixing shaft inserted into the inclined guide hole and the vertical guide hole to adjust the height of the moving unit.

9. A windows and doors assembly having a ventilation function and a horizontal contact function, comprising:

a window frame, and a windowsill in which the window frame is slidably installed;

a handle rotatably installed on the window frame;

an engagement unit provided on a lateral surface of the window frame, linked to movement of the handle, and moved in upward and downward directions;

an engagement guide provided on the windowsill to face the engagement unit and configured to catch or not catch the engagement unit depending on a position of the engagement unit; and a horizontal moving device provided on at least one of a top surface or a bottom surface of the window frame, linked to the handle, and configured to make the window frame come into horizontal contact with the windowsill or to release horizontal contact depending on movement of the handle, wherein the horizontal moving device comprises:

a fixing plate;

a moving plate disposed to be relatively moved on the fixing plate in a horizontal direction in which the window comes into contact with the windowsill or is moved apart from the windowsill and comprising a moving unit moveably installed along a rail of the windowsill;

a straight moving member that is connected to the fixing plate and is straightly moved by a predetermined distance by moving an operating bar connected to the handle of the window; and a pair of operating links configured to horizontally move the moving plate with respect to the fixing plate as the straight moving member is straightly moved, wherein the straight moving member comprises an operating hole into which an operating pin of the operating bar is inserted and configured to move the straight moving member immediately when the handle is rotated, and a guide hole into which a connection pin for connecting the operating links is inserted and configured to guide movement of the connection pin by moving the straight moving member, wherein when a contact state of the window with respect to the windowsill by the horizontal moving device is released while a catching operation between the engagement unit and the engagement guide is performed, it is possible to ventilate through a gap between the window and the windowsill, the window is restrictly moved to form the gap, and the window is prevented from being freely open, and wherein the guide hole comprises a straight moving path parallel to a moving direction of the straight moving member, and an extension moving path that extends from the straight moving path and extends in a different direction from the straight moving path.

10. The windows and doors assembly of claim 9, wherein the engagement unit comprises an engagement step formed with a step difference, the engagement guide comprises a body part, an engagement groove formed on the body part, and an opening formed below the engagement groove and connected to the engagement groove, and the engagement groove comprises an upper groove, an intermediate groove, and a lower groove, and the upper groove is disposed to be inclined in one direction compared with the lower groove.

11. The windows and doors assembly of claim 10, wherein the intermediate groove connects the upper groove and the lower groove to each other and is diagonally formed.

12. The windows and doors assembly of claim 10, wherein, when an end portion of the handle is positioned downwards to position the engagement unit at a first position, the engagement unit is positioned on the upper groove and is caught by an edge of the upper groove, when the end portion of the handle is horizontally positioned and the engagement unit is positioned at a second position lower than the first position, the engagement unit is positioned on the lower groove and is caught by an edge of the lower groove, and when the end portion of the handle is positioned upwards and the engagement unit is positioned at a third position than the second position, the engagement unit deviates downwards from the lower groove.

13. The windows and doors assembly of claim 12, wherein, when the engagement unit is positioned at the first position, the window frame comes into contact with the windowsill and becomes in a closing state, when the engagement unit is positioned at the second position, a contact state of the window frame with respect to the windowsill is released, a slight gap between a lateral surface of the window frame and a lateral surface of the windowsill is formed, and the engagement unit is caught by the engagement guide to prevent the window from being open, and when the engagement unit is positioned at the third position, the contact state of the window frame with respect to the windowsill is released, a state in which the engagement unit is caught by the engagement guide is released, and the window frame slides with respect to the windowsill to allow the window to be open.

14. The windows and doors assembly of claim 9, wherein the operating links comprises:

a first link having one end connected to the fixing plate and another end connected to the straight moving member, and disposed to be inclined at a predetermined operating angle with respect to a straight moving direction of the straight moving member to change the operating angle as the straight moving member is straightly moved; and a second link disposed to be symmetric with the first link, having one end connected to the moving plate and another end connected to the straight moving member, and configured to change an operating angle as the straight moving member is straightly moved.

15. The windows and doors assembly of claim 9, wherein the straight moving path comprises:

a first straight moving path connected to the extension moving path, and comprising a connection pin positioned thereon configured to connect the first link and the second link to each other in a state in which the engagement unit is caught by the lower groove of the engagement guide; and a second straight moving path connected to the first straight moving path, and comprising a connection pin positioned thereon configured to connect the first link and the second link to each other in a state in which the engagement unit is released from the engagement guide.

16. The windows and doors assembly of claim 9, further comprising:

the moving unit provided on the moving plate and comprising a plurality of wheels; and a height adjuster provided on the moving plate and configured to adjust a height of the moving unit, wherein the height adjuster comprises:

an internal housing surrounded by the moving unit and comprising an inclined guide hole into which a fixing shaft penetrating the moving unit is inserted;

an external housing surrounding the internal housing and comprising a vertical guide hole into which the fixing shaft is inserted and formed in upward and downward directions; and a height adjusting screw configured to screw the internal housing and the external housing to each other, and configured to adjust an interval between the internal housing the external housing, and to adjust a vertical height of the fixing shaft inserted into the inclined guide hole and the vertical guide hole to adjust the height of the moving unit.

* * * * *